(12) United States Patent
Kobayashi et al.

(10) Patent No.: US 8,827,683 B2
(45) Date of Patent: Sep. 9, 2014

(54) APPARATUS FOR AND METHOD OF FORMING FOOD INTO DOUGHNUT SHAPE

(75) Inventors: Masao Kobayashi, Fukui (JP); Hironori Kobayashi, Fukui (JP); Toru Fukiage, Fukui (JP)

(73) Assignee: Kobird Co., Ltd, Fukui (JP)

( * ) Notice: Subject to any disclaimer, the term of this patent is extended or adjusted under 35 U.S.C. 154(b) by 809 days.

(21) Appl. No.: 12/882,720

(22) Filed: Sep. 15, 2010

(65) Prior Publication Data
US 2011/0062621 A1    Mar. 17, 2011

(30) Foreign Application Priority Data

Sep. 16, 2009 (JP) ................................. 2009-213888
Jun. 22, 2010 (JP) ................................. 2010-141152

(51) Int. Cl.
*A21C 11/16* (2006.01)

(52) U.S. Cl.
USPC .......................................... 425/287; 425/288

(58) Field of Classification Search
CPC ... A21C 11/103; A21C 11/163; A21C 11/166
USPC .................................................. 425/287, 288
See application file for complete search history.

(56) References Cited

U.S. PATENT DOCUMENTS

| | | | | |
|---|---|---|---|---|
| 2,779,298 A | * | 1/1957 | Chwirut et al. | 425/288 |
| 3,572,259 A | * | 3/1971 | Hayashi | 425/132 |
| 3,807,919 A | | 4/1974 | Kaufman, Jr. | |
| 4,251,201 A | * | 2/1981 | Krysiak | 425/132 |
| 4,734,024 A | * | 3/1988 | Tashiro | 425/132 |

FOREIGN PATENT DOCUMENTS

| | | |
|---|---|---|
| JP | 5284996 | 6/1977 |
| JP | 2004041008 A | 2/2004 |
| JP | 2006288313 A | 10/2006 |
| JP | 2007082461 A | 4/2007 |
| JP | 4274569 B2 | 3/2009 |
| JP | 4437843 B1 | 3/2010 |

OTHER PUBLICATIONS

Japanese Office Action corresponding to Japanese Patent Application No. 2010141152, dated Sep. 3, 2010.
Korean Office Action corresponding to Korean Patent Application No. 10-2010-0090309, dated Jul. 27, 2012.

* cited by examiner

*Primary Examiner* — Alison Hindenlang
(74) *Attorney, Agent, or Firm* — Sughrue Mion, PLLC

(57) ABSTRACT

The present invention is directed to provide an apparatus and method for forming food into doughnut shape that is capable of forming food into rings with a simple structure. The apparatus includes a supplying unit supplying a food material 2; a discharging unit 3 continuously discharging the supplied food material through a nozzle; a forming unit 4 dividing the food material into rings; a conveyor belt 5 carrying the resulting doughnut-shaped food products; and a support unit 6 supporting the products. The supplying unit 2 supplies an outer food material F and an inner food material G to the discharging unit 3 under pressure. The discharging unit 3 includes an inside forming member 32, around which the inner food material G is intermittently discharged from an annular outlet 34, and the outer food material is continuously discharged to sandwich the inner food material G, resulting in formation of a tubular food material. The forming unit 4 includes a plurality of shutter members 40 disposed around the discharging unit 3, and moves the shutter members 40 to divide the continuously discharged tubular food material into pieces of a doughnut shape.

10 Claims, 22 Drawing Sheets

APPARATUS FOR AND METHOD OF FORMING FOOD INTO DOUGHNUT SHAPE

TECHNICAL FIELD

The present invention relates to an apparatus for and method of forming food into a doughnut shape that involves dividing continuously discharged food material into ring-shaped pieces.

DESCRIPTION OF THE RELATED ART

Ring-shaped food products such as doughnuts have been made and sold, up to now. Various methods for mass production of such food products have been proposed.

For example, Patent Literature 1 discloses a method including: supplying a batch of dough through a dough supply tube into a ring-shaped cup; simultaneously supplying an inner filling material into the dough through a filling supply tube disposed inside of the dough supply tube; and splitting the dough and filling material from the inside of the cup using a cutter sleeve to shape the dough into rings. Patent Literature 2 discloses another method including: sandwiching an annular filling material with circular bread dough portions to make a bread piece; connecting the surfaces of the dough portions each other to cover the filling material; and hollowing the central portion of the bread piece along the inside of the inner diameter of the filling, such that the dough portions are mutually connected at the inner surfaces to define an annular shape.

SUMMARY OF INVENTION

Technical Problem

The apparatus used in the method disclosed in Patent Literature 1 has a complex mechanism having many components, and the mass production of the apparatus is unpractical. The mechanism requires modifications for food products of different sizes, which limits the types of products the apparatus can provide. Furthermore, the mechanism cannot adapt well to different properties such as viscosity of food, which may result in incomplete shaping of food. The method disclosed in Patent Literature 2 includes lamination of dough portions before shaping, which is not suitable for mechanization and mass production.

The present invention is directed to provide an apparatus and method capable of forming food into doughnut shape with a simple structure.

Solution to Problem

An apparatus for forming food into doughnut shape according to an aspect of the present invention includes: a supplying unit supplying a food material; a discharging unit including a nozzle discharging the supplied food material downward, an inside forming member disposed inside of the nozzle and protruding downward therefrom, and an outlet between the nozzle and the inside forming member, that the outlet discharging the food material into a tubular shape; and a forming unit including a cutting member disposed under the discharging unit and around the inside forming member, the forming unit dividing the tubular food material into rings by moving the cutting member across the tubular food discharged from the discharging unit so as to bring the cutting member into contact with a surface of the inside forming member.

An apparatus for forming food into doughnut shape according to another aspect of the present invention includes: a supplying unit supplying an inner food material and an outer food material; a discharging unit including a plurality of nozzles combined as multiple nozzles to discharge the inner food material and the outer food material downward, an inside forming member disposed inside of the nozzles and protruding downward therefrom, and a plurality of annular outlets between each of the nozzles and the inside forming member, the annular outlets discharging the food materials into a tubular shape with the outer food material sandwiching the inner food material; an opening/closing unit opening and closing the annular outlet from which the inner food material is intermittently discharged as ring portions at intervals; and a forming unit including a cutting member disposed under the discharging unit and around the inside forming member, the forming unit dividing the tubular food material discharged from the discharging unit into rings by moving the cutting member across the outer food material between the ring portions of the inner food material so as to bring the cutting member into contact with a surface of the inside forming member.

A method of forming food into doughnut shape according to another aspect of the present invention includes: discharging a food material from an outlet disposed between an inside forming member and a nozzle, the inside forming member being disposed inside of the nozzle and protruding therefrom; and moving a cutting member disposed around the inside forming member across the discharged food material so as to be brought into contact with a surface of the inside forming member to divide the food material discharged from the outlet into rings.

A method of forming food into doughnut shape according to another aspect of the present invention includes: discharging an inner food material and an outer food material into a tubular shape from a plurality of annular outlets between an inside forming member and nozzles combined as multiple nozzles in a nozzle unit, the inside forming member disposed inside of the nozzle unit and protruding downward therefrom, the inner food material discharged intermittently as ring portions at intervals by opening and closing one of the annular outlets from which the inner food material is discharged, the outer food material discharged continuously from the other annular outlets to sandwich the inner food material; and moving a cutting member disposed around the inside forming member across the discharged outer food material between the ring portions of the inner food material so as to be brought into contact with a surface of the inside forming member to divide the tubular food material into rings.

The above structure includes an inside forming member that protrudes downward from a nozzle to stabilize continuous discharge of food material, and a cutting member that is brought into contact with a surface of the inside forming member across the tubular outer food material, which is continuously discharged, to divide the food material into rings. Accordingly, such simple structure enables quick and accurate formation of doughnut-shaped food products, considerably contributing to mass production of the products.

The quick and accurate formation of doughnut-shaped food products each having a ring-shaped inner material portions covered with an outer food material can be achieved by: discharging an inner food material and an outer food material into a tubular shape from a plurality of annular outlets between an inside forming member and nozzles combined as multiple nozzles in a nozzle unit, the inside forming member disposed inside of the nozzle unit and protruding downward therefrom, the inner food material discharged intermittently as ring portions at intervals by opening and closing one of the annular outlets from which the inner food material is discharged, the outer food material discharged continuously from the other annular outlets to sandwich the inner food material; and moving a cutting member disposed around the inside forming member across the discharged outer food material between the ring portions of the inner food material so as to be brought into contact with a surface of the inside forming member, to divide the tubular food material into rings.

DESCRIPTION OF THE EMBODIMENTS

The present invention is now described in detail with reference to preferred embodiments with various limitations. These embodiments, however, are provided only for illustration and are not intended to limit the present invention unless otherwise specified.

Figure 1:
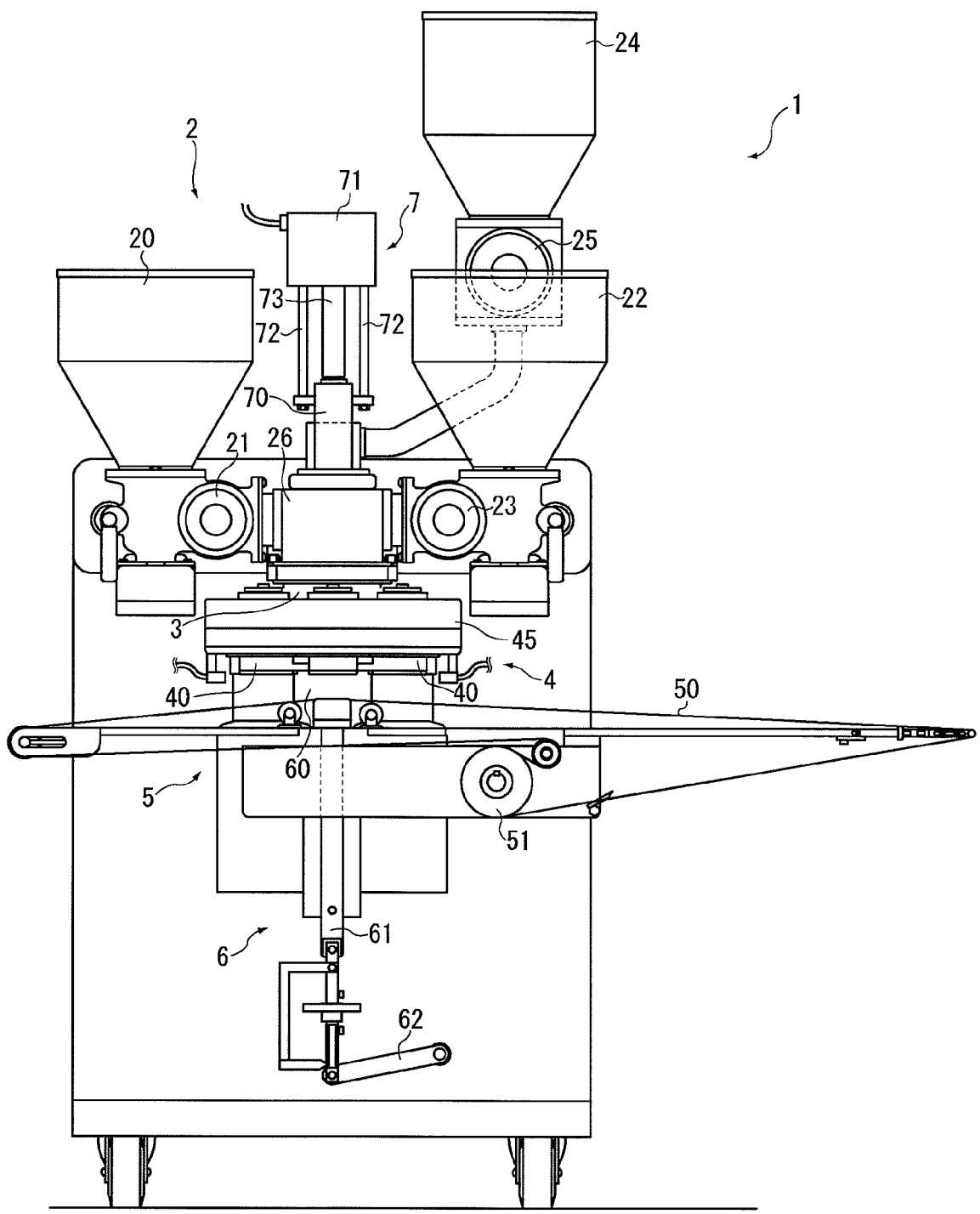
FIG. 1 is a front view illustrating a first embodiment of the present invention.

FIG. 1 is a front view illustrating a first embodiment of the present invention. An apparatus for forming food includes a supplying unit 2 supplying a food material, a discharging unit 3 continuously discharging the food material through a nozzle, a forming unit 4 dividing the food material into rings, a conveyor belt 5 conveying the resulting doughnut-shaped food products, and a support unit 6 supporting the products.

The supplying unit 2 supplies an outer food material F and an inner food material G to the discharging unit 3 under pressure. The inner food material G passes through a hopper 20 to a supply line 26 under pressure of a vane pump 21, whereas a batch of the outer food material F passes through a hopper 22 to the supply line 26 under pressure of the vane pump 23. Another batch of the food material F passes through a hopper 24 to the supply line 26 under pressure of a pump 25.

The discharging unit 3 is connected to the bottom of the supply line 26, so that the outer and inner food materials F and G are discharged downward through the nozzle.

The forming unit 4 includes a plurality of shutter members 40 surrounding the discharging unit 3 as a cutting member, to divide the food materials into a doughnut shape while the materials are continuously discharged through the nozzle.

The conveyor belt 5 is disposed below the forming unit 4, and includes a conveyor belt 50 and a drive roller 51 for driving the belt 50. The doughnut-shaped food products after division are placed on the conveyor belt 50 to be conveyed to the right in the drawing for a subsequent process.

The support unit 6 includes a support member 60 disposed in contact with the rear surface of the conveyor belt 50, a support rod 61 holding the support member 60, and a driving bar 62 causing vertical movement of the support rod 61. Rotation of the driving bar 62 by a driving motor (not illustrated) causes vertical movement of the support member 60. The vertically upward movement of the support member 60 causes the conveyor belt 50 to be lifted to a position close to the rear surface of the forming unit 4.

A nozzle closure 7 opens/closes an annular outlet which will be described below, and includes a support arm 70 supporting an inner cylinder that has an inner-nozzle cap, a drive mechanism 71 driving the support arm 70 vertically, and support rods 72 supporting a mounting cylinder. The support rods 72 have an upper end fixed to a table on which the drive mechanism 71 resides, and a lower end supporting a mounting cylinder, which will be described later. From the bottom of the drive mechanism 71, a drive rod 73 extends downward to be connected to the top portion of the support arm 70, so that vertical movements of the drive rod 73 results in vertical movements of the support arm 70.

The drive mechanism 71 may be any mechanism for vertical movement, including a rotation drive mechanism using an air cylinder or eccentric cam.

Figure 2:
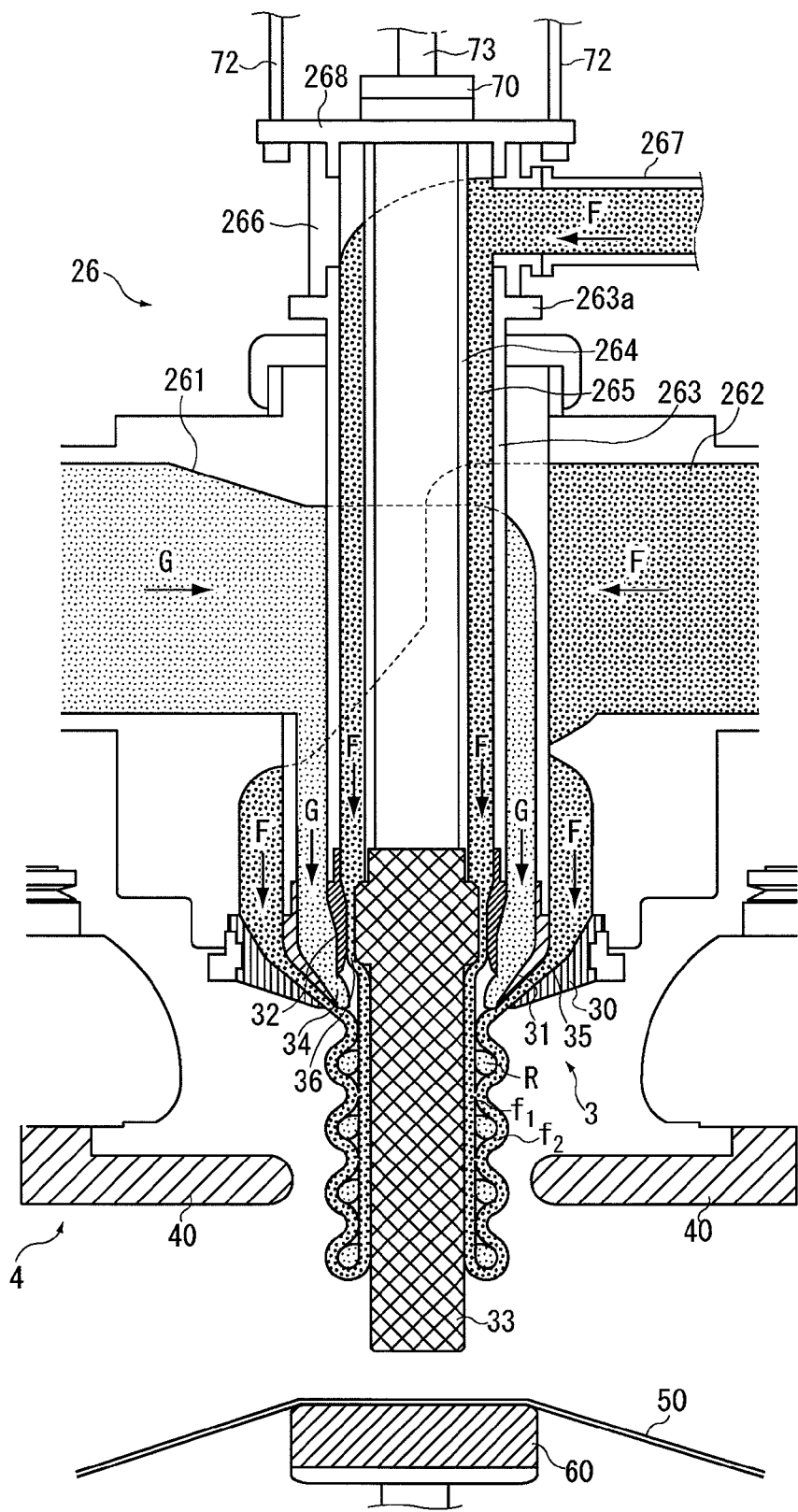
FIG. 2 is a schematic front cross sectional view illustrating the supply line, the discharging unit, and the forming unit in FIG. 1.
Figure 3:
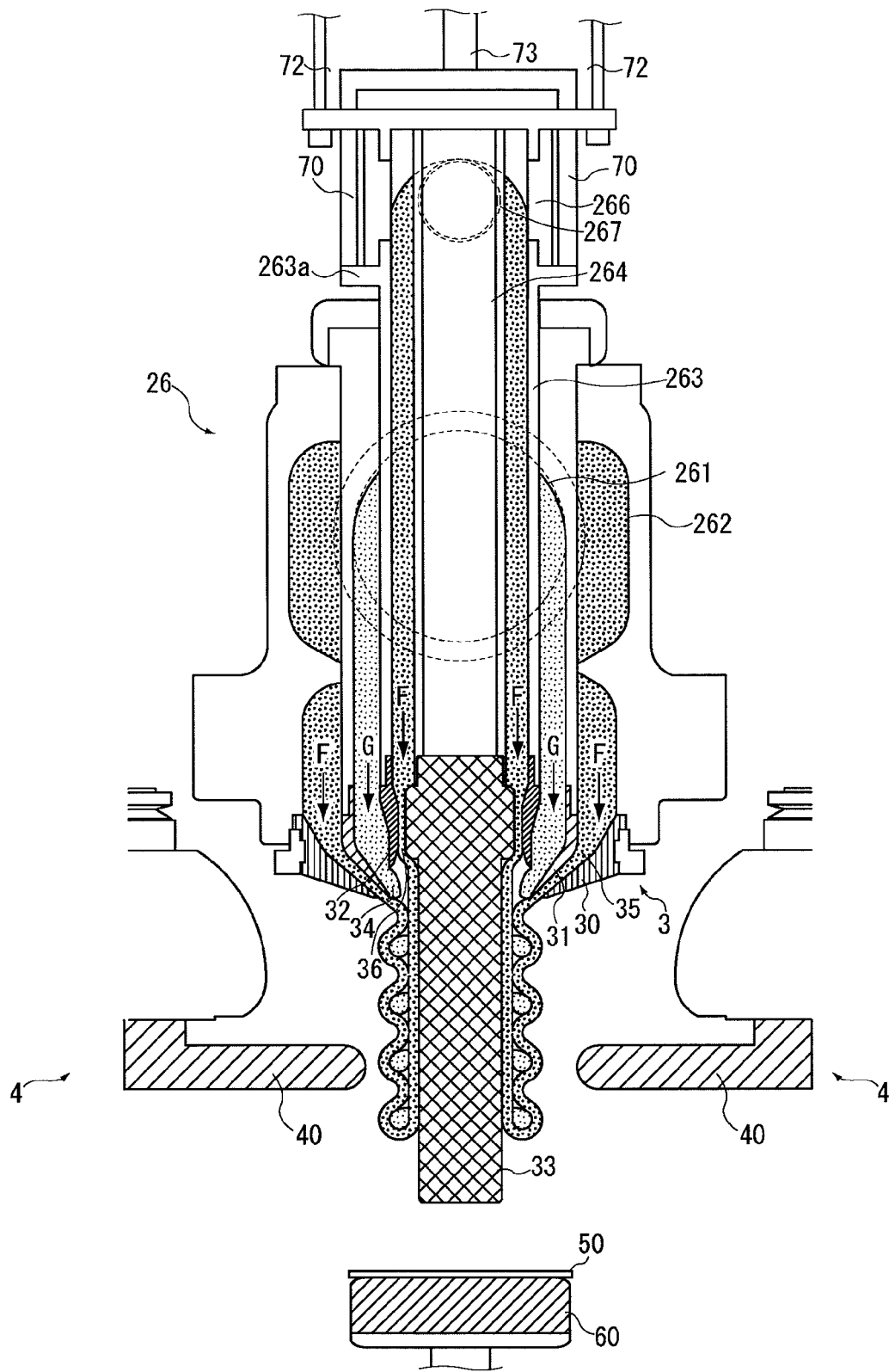
FIG. 3 is a schematic side cross sectional view illustrating the supply line, the discharging unit, and the forming unit in FIG. 1.

FIG. 2 is a schematic cross sectional view illustrating the supply line 26, the discharging unit 3, and the forming unit 4 in the direction parallel to the sheet of FIG. 1, whereas FIG. 3 is a schematic cross sectional view illustrating those in the direction perpendicular to the sheet of FIG. 1. The supply line 26 includes an inner-material supply line 261 supplying the inner food material G downward, and an outer-material supply line 262 supplying the outer food material F downward. The inner- and outer-material supply lines 261 and 262 curve downward to have a dual structure where the outer-material supply line 262 surrounds the inner-material supply line 261.

The inner-material supply line 261 further includes an inner cylinder 263 and a mounting cylinder 264 coaxially therein to have a triplex structure. There is a predetermined space between the inner cylinder 263 and the mounting cylinder 264, and so between the mounting cylinder 264 and the inner-material supply line 261.

The annular space between the mounting cylinder 264 and the inner cylinder 263 provides an inner supply line 265 supplying the outer food material. In this embodiment, the outer-material supply line 262 serves as an outer supply line supplying the outer food material. The inner cylinder 263 is slidably connected, at its upper end, to the lower end of a coupling tube 266. The coupling tube 266 has an opening, at its circumferential surface, in communication with a supply tube 267. The supply tube 267 is connected to the pump 25, so that the food material F in the hopper 24 is supplied to the supply line 265 through the supply tube 267 and the coupling tube 266.

The mounting cylinder 264 passes through the coupling tube 266 to be connected, at its upper end, to a fixing member 268. The fixing member 268 is fixed to the lower end of the support rods 72, and thereby the mounting cylinder 264 is supported by and fixed to the support rods 72. The fixing member 268 has a bottom surface to which the upper end of the coupling tube 266 is fixedly mounted.

The inner cylinder 263 is vertically movable in the inner-material supply line 261, and has an upper end slidably mounted to the coupling tube 266, and a flange 263a around the upper end that is fixed to the support arm 70. Thus, vertical movement of the support arm 70 causes the inner cylinder 263 to vertically move along the axis of the inner-material supply line 261.

The discharging unit 3 includes a nozzle having: an outer-nozzle cap 30, a middle-nozzle cap 31, and an inner-nozzle cap 32 overlying one another; and an inside forming member 33 therein (the inside of the inner-nozzle cap 32).

The outer-nozzle cap 30 is fit in the lower end opening of the outer-material supply line 262: the middle-nozzle cap 31 in that of the inner-material supply line 261: and the inner-nozzle cap 32 in that of the inner cylinder 263. The inside forming member 33 is a bar component coaxially fixed to the lower end of the mounting cylinder 264, and has a lower end protruding downward from an annular outlet 34 to face the top of the support member 60.

Figure 4:
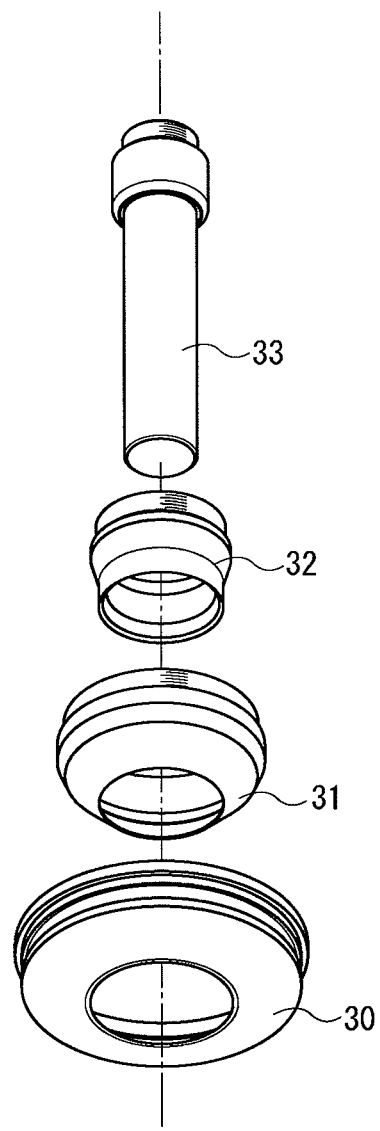
FIG. 4 is an exploded perspective view illustrating a discharging unit.

The outer-nozzle cap 30, the middle-nozzle cap 31, the inner-nozzle cap 32, and the inside forming member 33 are coaxially disposed, and as illustrated in the exploded perspective view of FIG. 4, the caps each have a circular opening at the lower end thereof, the openings being concentrically arranged. Through the openings, the circular inside forming member 33 is concentrically arranged. This arrangement provides concentric annular outlets between the inside forming member 33 and each cap.

The annular outlet 34 between the middle-nozzle cap 31 and the inner-nozzle cap 32 is in communication with the inner-material supply line 261 to discharge the inner food material G. The annular outlet 35 between the outer-nozzle cap 30 and the middle-nozzle cap 31 is in communication with the outer-material supply line 262 to discharge the outer food material F. The annular outlet 36 between the inner-nozzle cap 32 and the inside forming member 33 is in communication with the inner supply line 265 to discharge the outer food material F.

The inner-nozzle cap 32 vertically moves based on the vertical movement of the inner cylinder 263. As illustrated in FIG. 2, upward movement of the inner cylinder 263 causes the inner-nozzle cap 32 to be away from the middle-nozzle cap 31, and opens the annular outlet 34. Downward movement of the inner cylinder 263 causes the lower end of the inner-nozzle cap 32 to abut the lower end of the middle-nozzle cap 31, and closes the annular outlet 34. Accordingly, the repetition of the upward movement of the inner cylinder 263 for a predetermined period of time and downward movement for a predetermined period results in regular opening and closing of the annular outlet 34. By driving the pump 21 to supply the inner food material G to the inner-material supply line 261 under pressure only while the annular outlet 34 is open, the inner food material G can be intermittently discharged from the annular outlet 34.

The intermittent discharge of the inner food material G from annular outlet 34 provides the inner food material portions of a ring shape. In this case, the inner food material needs to have a substantially ring shape by opening and closing of the annular outlet 34. Some leak of the inner food material G into the ring hole of each portion is allowable if there is no trouble in the shaping operation. In addition, depending on the type of food material used, the inner-nozzle cap 32 may be operated to make the annular outlet 34 semi-open to reduce its open area.

The outer food material F is continuously discharged from between the inner-nozzle cap 32 and the inside forming member 33 toward the outer periphery surface of the inside forming member 33 because the inner periphery surface of the inner-nozzle cap 32 slightly inwardly inclines toward the inside forming member 33, the inner periphery surface being disposed opposite to the inside forming member 33. As a result, the discharged outer food material F is brought into close contact with the outer periphery surface to form an inside outer-material layer f1.

From the annular outlet 34, the inner food material G is intermittently discharged such that ring-shaped portions of the inner food material R are brought into close contact with the inside outer-material layer f1 at predetermined intervals. Because the inner periphery surface of the middle-nozzle cap 31, which forms the annular outlet 34, inwardly inclines, the inner food material G is discharged from the annular outlet 34 toward the inside outer-material layer f1. The inner-nozzle cap 32 has a lower end opening that is slightly curved outward. Thus, when the lower end of the inner-nozzle cap 32 contacts the middle-nozzle cap 31, the annular outlet 34 is reliably closed. The inner-nozzle cap 32, which works with the middle-nozzle cap 31 to reliably open/close the annular outlet 34, may be of any shape.

After continuously discharged from between the outer-nozzle cap 30 and the middle-nozzle cap 31, the outer food material F forms an outside outer-material layer f2 that covers the ring-shaped portions of the inner food material R. Like the middle-nozzle cap 31, the outer-nozzle cap 30 has an inner periphery surface slightly inclining inward, so that the outer food material F is discharged toward the inside outer-material layer f1 and the ring-shaped portions of the inner food material R.

As a result, the ring-shaped portions of the inner food material R, the inside outer-material layer f1, and the outside outer-material layer f2 are formed into a tube around the inside forming member 33 and continuously discharged, with the ring-shaped portions of the inner food material R being sandwiched between the inside and outside outer-material layers f1 and f2.

Each of the caps may have any shape depending on the type and amount of the food materials. For example, caps may be curved outward/inward to increase/decrease their opening areas, or may be straight cylindrical. The annular spaces between the caps can be thus controlled to regulate the amount of food materials discharged.

Figure 5A:
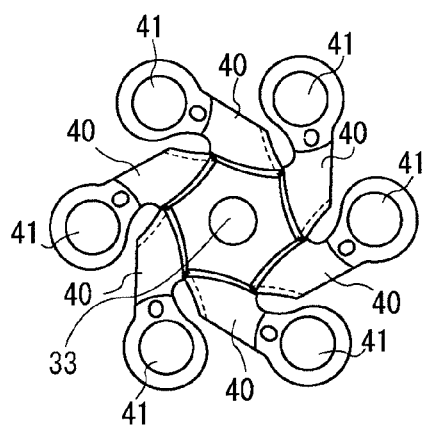
FIGS. 5A-5D are plan views illustrating shutter members and a driving mechanism in a forming unit.
Figure 5B:
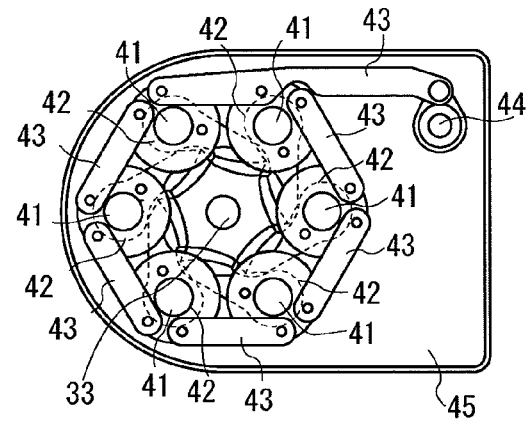
Figure 5C:
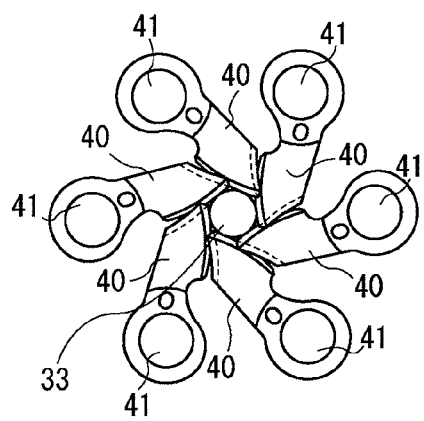
Figure 5D:
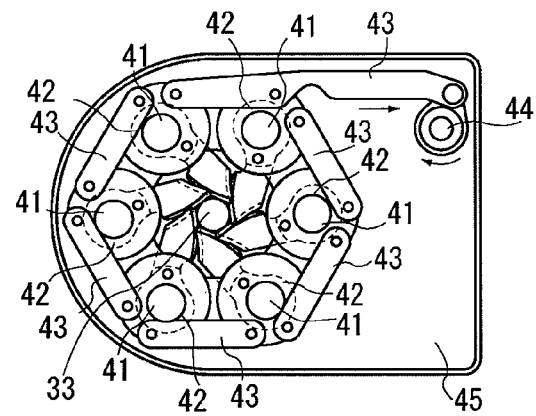

FIGS. 5A-5D are plan views illustrating the operations of shutter members 40 and their drive mechanism in the forming unit 4: FIGS. 5A-5B illustrate the six shutter members 40 that are open after rotated; and FIGS. 5C-5D illustrate those in contact with a surface of the inside forming member 33. Each of the shutter members 40 has a driving shaft 41 having an upper end rotatably supported by the top surface of a flame 45 via a circular flange 42. The flanges 42 are coupled one another by pivotally connected links 43. One of the links 43 extends to be pivotally connected to a rotary shaft 44 of a driving motor (not illustrated).

The rotation of the rotary shaft 44 causes the links 43 to rotate, which results in synchronized rotation of the flanges 42. When the rotary shaft 44 rotates clockwise by a predetermined angle as illustrated in FIG. 5C to close the shutter members 40 that are open as illustrated in FIG. 5A, the shutter members 40 rotate in a closing direction to contact the surface of the inside forming member 33. Accordingly, reciprocating rotations of the rotary shaft 44 by a predetermined angle causes reciprocating swings of the shutter members 40, resulting in the operations for dividing the food materials.

FIGS. 6A-6B to FIGS. 9A-9B illustrate processes for dividing the food materials that are continuously discharged from the discharging unit 3. FIGS. 6A-9A are plan views illustrating operations of the shutter members: FIGS. 6B-9B are cross sectional views illustrating the discharging unit 3 and the forming unit 4 in each process.

Figure 6A:
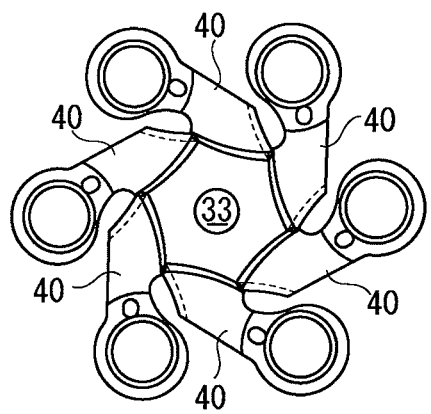
FIGS. 6A-6B illustrate the processes for dividing food materials into rings while the materials are continuously discharged from a discharging unit.
Figure 6B:
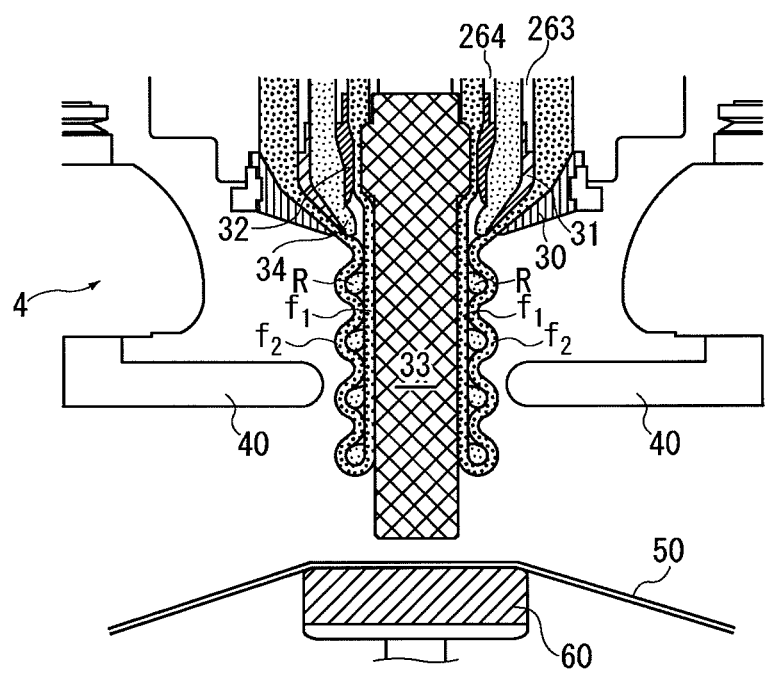

In FIGS. 6A-6B, the shutter members 40 of the forming unit 4 are open, and the three-layered tubular food material is extruded downward from the discharging unit 3 along the inside forming member 33, the tubular food material including the intermittently discharged ring-shaped portions of the inner food material R sandwiched by the inside and outside outer-material layers f1 and f2. The lower end of the tubular food material is cut by the shutter members 40 at positions where the inside and outside outer-material layers f1 and f2 adhere to each other between the ring-shaped portions of the inner food material R. This makes each of the ring-shaped portions of the inner food material R covered with the outer food material F without exposure.

The inner cylinder 263 moves upward to raise the inner-nozzle cap 32 and thus to open the annular outlet 34, leading to intermittent discharge of the inner food material G as the ring-shaped portions R. Because the inside and outside outer-material layers f1 and f2 are continuously discharged downward, the ring-shaped inner material portions R is disposed between the layers f1 and f2 at equal intervals.

The support member 60 then rises to lift the conveyor belt 50, such that the formed food products falls onto the conveyor belt 50.

Figure 7A:
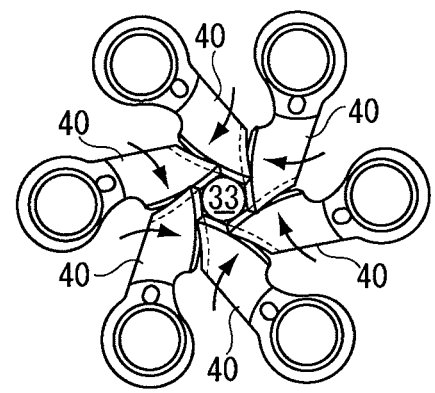
FIGS. 7A-7B illustrate the processes for dividing food materials into rings while the materials are continuously discharged from a discharging unit.
Figure 7B:
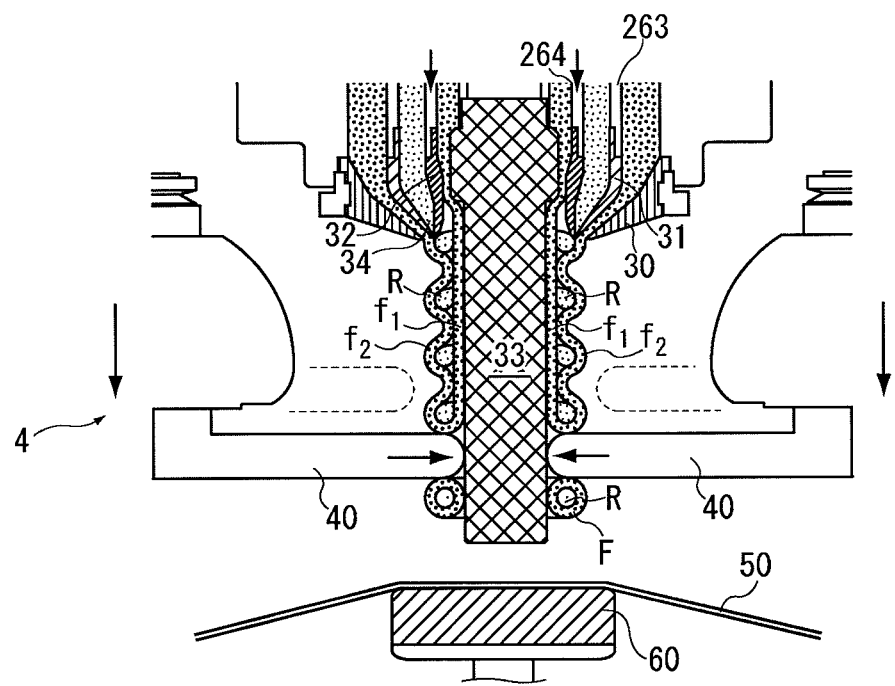

As illustrated in FIG. 7B, when the tubular food material comes below a predetermined position around the inside forming member 33, the shutter members 40 moves in the closing direction to contact with a surface of the inside forming member 33. For this movement, the entire forming unit 4 moves downward, so that the shutter members 40 presses against and divide the tubular food material at the position where the inside and outside outer-material layers f1 and f2 adhere to each other between the lowest and the next lowest ring-shaped inner material portions R. This prevents the ring-shaped inner material portion R from leaking from the surfaces of the divided piece, and the divided piece includes the inner food material G completely covered with the outer food material F. The ring-shaped inner material portion R in the remaining undivided tubular food material is also covered with the outer food material F.

The inner cylinder 263 then moves downward to lower the inner-nozzle cap 32 to close the annular outlet 34, leading to intermittent discharge of the inner food material G as a ring-shaped inner material portion R attached to the inside outer-material layer f1 on one side. Then, the outside outer-material layer f2 covers the other side of the ring-shaped inner material portion R. In this way, the ring-shaped inner material portions R are stabilized between the two outer layers at intervals.

Figure 8A:
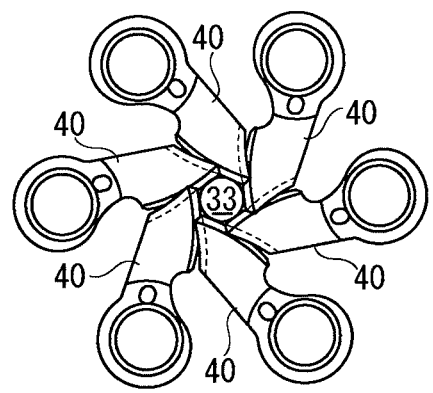
FIGS. 8A-8B illustrate the processes for dividing food materials into rings while the materials are continuously discharged from a discharging unit.
Figure 8B:
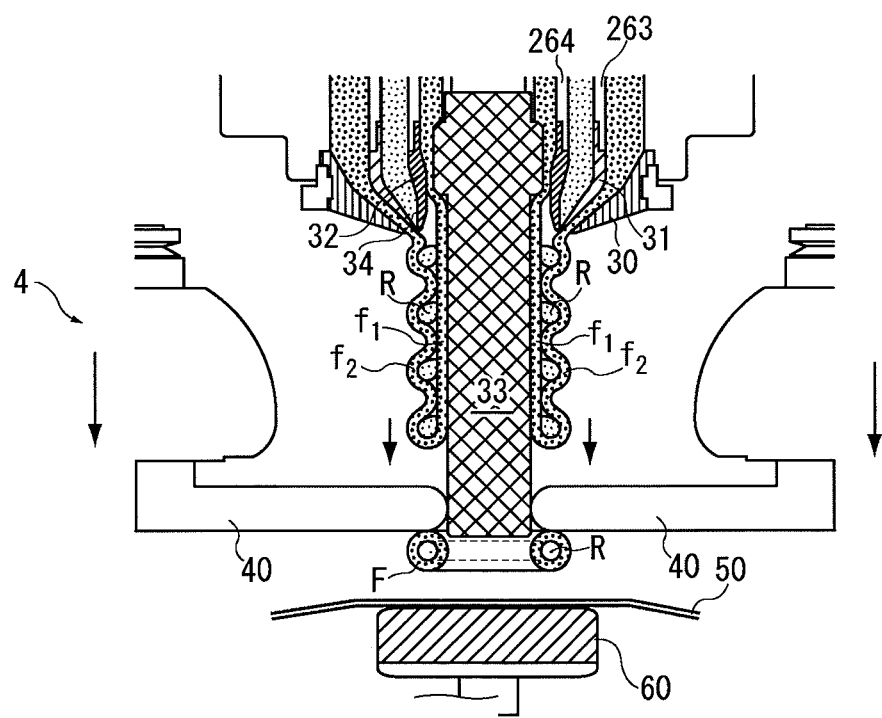

In FIG. 8B, the forming unit 4 is lowered with the shutter members 40 being in contact with the inside forming member 33. This causes the shutter members 40 to slide down along the inside forming member 33, so that the divided tubular food material is scraped off from the inside forming member 33.

Figure 9A:
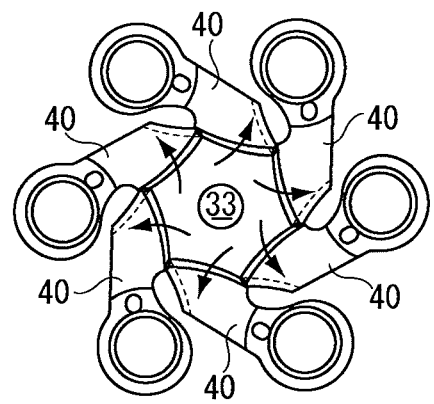
FIGS. 9A-9B illustrate the processes for dividing food materials into rings while the materials are continuously discharged from a discharging unit.
Figure 9B:
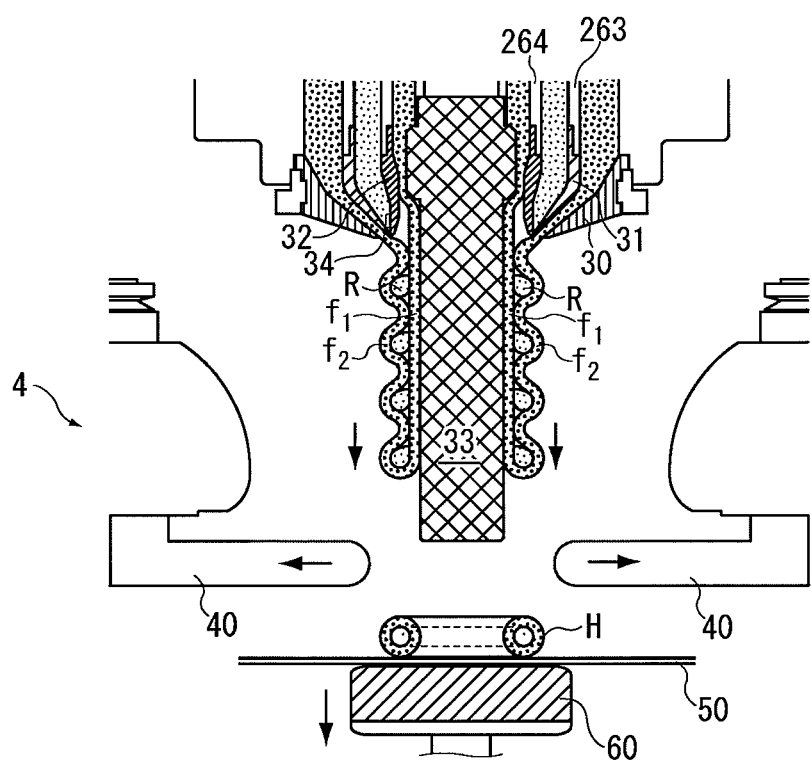

Then in FIG. 9B, the forming unit 4 moves the shutter members 40 to a position below the lower end of the inside forming member 33 and opens them, and then lifts them up to the position illustrated in FIG. 6 for next shaping operation. The formed food products H off from the inside forming member 33 by the downward movement of the shutter members 40 are disposed on the conveyor belt 50, and are conveyed thereon after the support member 60 is lowered.

Because the shutter members 40 is in contact with and slides along the inside forming member 33, the formed food products H can be scraped off from the inside forming member 33, keeping their shape. The formed food products H are supported from their bottom by the conveyor belt 50 while conveyed, which also allows the formed food products H to keep their shape.

Figure 10A:
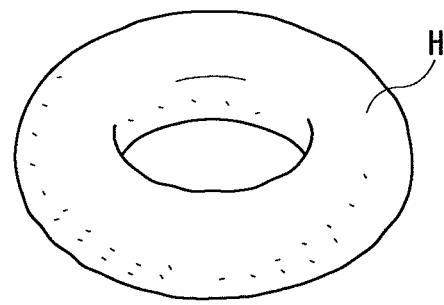
FIGS. 10A-10C are respectively a perspective view, a transverse sectional view, and a longitudinal sectional view illustrating a shaped food product H.
Figure 10B:
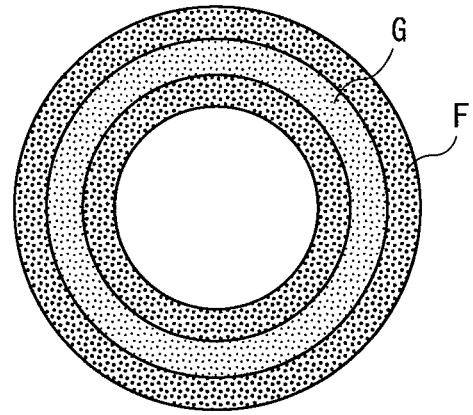
Figure 10C:
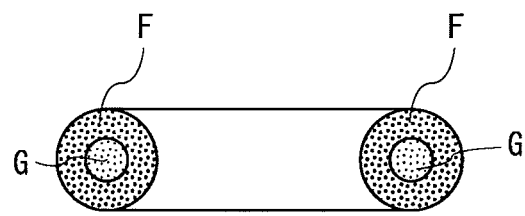

FIG. 10A is a perspective view, FIG. 10B is a transverse sectional view, and FIG. 10C is a longitudinal sectional view, each illustrating a formed food product H. The formed food product H is of a doughnut shape with the ring inner food material G entirely covered with the outer food material F.

Examples of the formed food product include various types of doughnut-shaped foods depending on the combinations of the inner food material and the outer food material, such as ring-shaped stuffed doughnuts, ring-shaped cream-filled sweet potato cakes, ring-shaped stuffed dumplings, ring-shaped stuffed rice cakes, ring-shaped cheese-filled croquettes, and ring-shaped Chinese steamed buns filled with minced pork and vegetables or bean-paste. The inner food material may be granulated food such as nuts and mince filling, or paste food.

If the outer food material is the same as the inner food material, doughnut-shaped food products of a single food material can be easily formed. Doughnut-shaped food products can be similarly formed with a single food material or plural different food materials.

Figure 11A:
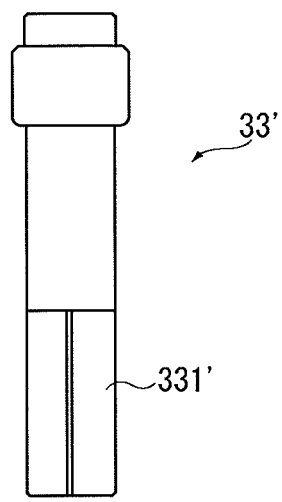
FIGS. 11A-11C are respectively a front view and a plan view illustrating a modification of an inside forming member, and a plane view illustrating shutter members in contact with the inside forming member.
Figure 11B:
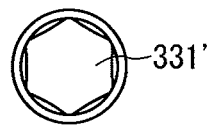
Figure 11C:
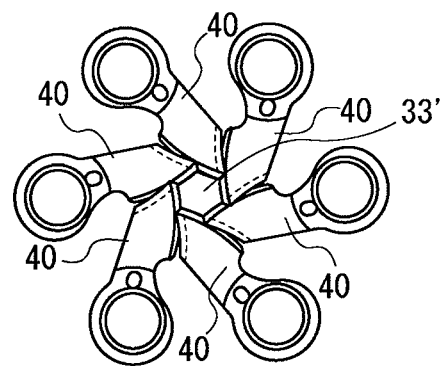

FIG. 11A is a front view and FIG. 11B is a plan view, each illustrating a modification of the inside forming member 33, and FIG. 11C illustrates the modification with the shutter members 40 therearound. An inside forming member 33' of this embodiment has a hexagonal shaping face 331' according to the number of the shutter members 40. As illustrated in FIG. 11C, the hexagonal shaping face 331' enables closer contact of the shutter members 40 therebetween, resulting in more reliable dividing of food materials. Specifically, the food material can be cleanly separated from the shaping face 331' by the sliding down of the shutter members 40 on the shaping face 331'. Especially, the hexagonal shaping face 331' is more effective for separation when a hard outer food material is used. For soft outer food materials, both hexagonal and round shaping faces are effective.

Figure 12A:
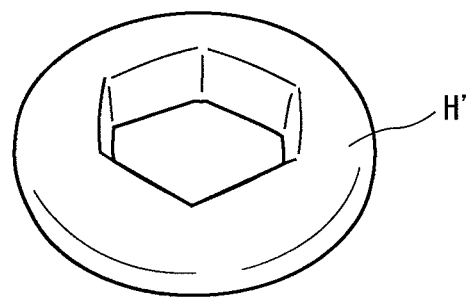
FIGS. 12A-12C are respectively a perspective view, a transverse sectional view, and a longitudinal sectional view illustrating a food product formed by a hexagonal inside forming member.
Figure 12B:
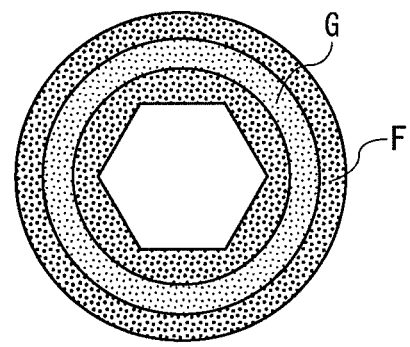
Figure 12C:
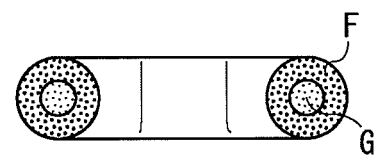

FIG. 12A is a perspective view, FIG. 12B is a transverse sectional, and FIG. 12C is a longitudinal sectional view, each illustrating a formed food product H' formed by a hexagonal inside forming member. The formed food product H' has a doughnut shape with a hexagonal hole, and is composed of the ring inner food material G and the outer food material F completely covering the inner food material G.

The inside forming member to which the shutter members contact without space therebetween may have any shape without any limitation to hexagon, according to the number of the shutter members.

In the above first embodiment, the apparatus forms doughnut-shaped food products by covering an inner food material with outer food materials. If the inner food material is the same as the outer food material and the annular outlet 34 is kept open, the apparatus can easily form doughnut-shaped food products of a single food material. In the case where the apparatus is used only for doughnut-shaped food products of a single food material, the tube for supplying inner food material can be eliminated, so that only an outer food material is continuously discharged around the inside forming member.

In the above first embodiment, the outer food material is supplied through the outer and inner supply lines, using two hoppers and two pumps, to the inside and outside of the inner food material. The outer food material, however, may be supplied through only one outer supply line. In this case, a branch tube is provided between an inner-material supply line and an inner-nozzle cap such that an outer food material can passes through an outside supply line and the branch line to be discharged between the inner-nozzle cap and the inside forming member. As a result, the inner food material passing through the branch tube is intermittently discharged from the annular outlet, a first outer food material passing through the branch tube is continuously discharged to the inside of the discharged inner food material, and a second outer food material passing through the outer supply line is continuously discharged to the outside of the discharged inner food material, which forms a tubular food material having a triplex structure.

In the above first embodiment, the annular outlet between the inner-nozzle cap and the middle-nozzle cap is controlled by the opening and closing of the inner cap for intermittent discharge, but may be controlled using the middle-nozzle cap. In addition, the inner-nozzle cap is moved based on the vertical movement of the inner cylinder, but may be solely moved. For example, a driving rod may be mounted along the inner cylinder, such that the inner-nozzle cap is solely moved vertically. Alternatively, a magnetic material may be mounted to the cap, such that the cap is vertically moved by an external apparatus using magnetic force such as electromagnet. When a branch tube is provided to the inner food material supply as described above, such means for moving the cap solely facilitate the opening and closing of the annular outlet.

The forming unit 4 of the first embodiment uses six shutter members 40 as a cutting member, but the number may be any, for example four or eight. The face of the shutter members to be brought in contact with the inside forming member may be rounded or flat depending on the properties of the food material to be divided.

Figure 13:
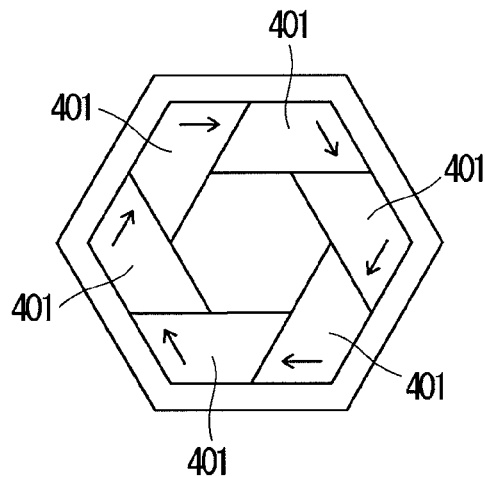
FIG. 13 is a schematic plan view illustrating a modification of a shutter mechanism.
Figure 14A:
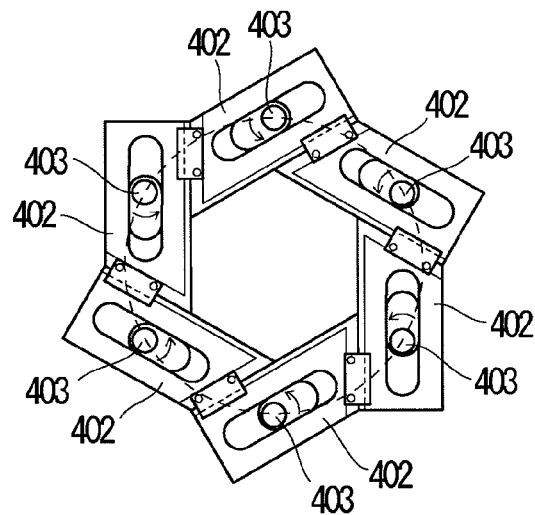
FIGS. 14A-14B are schematic plan views illustrating another modification of a shutter mechanism.
Figure 14B:
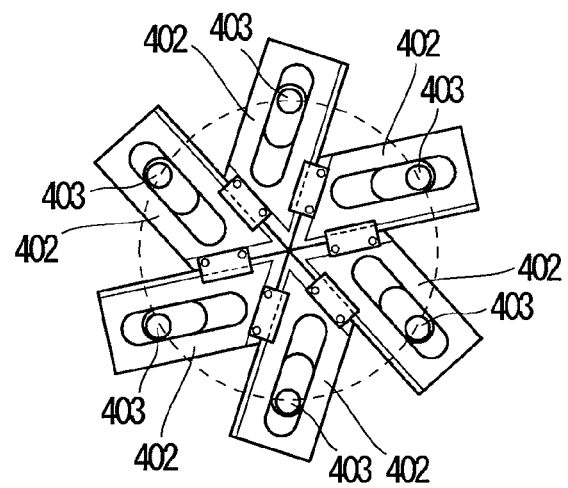

In the above first embodiment, the drive mechanism using the reciprocating swing of the shutter members around the driving shaft is used for the dividing operation, but the present invention is not limited to that shutter driving means. For example, as illustrated in FIG. 13, shutter members 401 may be used which slide in the directions of arrows respectively for linear movement. Alternatively, as illustrated in FIGS. 14A and 14B, shutter members 402 may be used which pivot while moving linearly respectively in response to the rotations of operation pins 403 in the directions of arrows, each shutter member 402 being pivotally mounted to each of the operation pins 403.

Other the above shutter mechanisms, any mechanism capable of dividing the tubular food material around the inside forming member may be used. For example, a squeeze mechanism around the inside forming member may be used which squeezes, cuts and drops off the food materials that are continuously discharged in tubular form.

Figure 15:
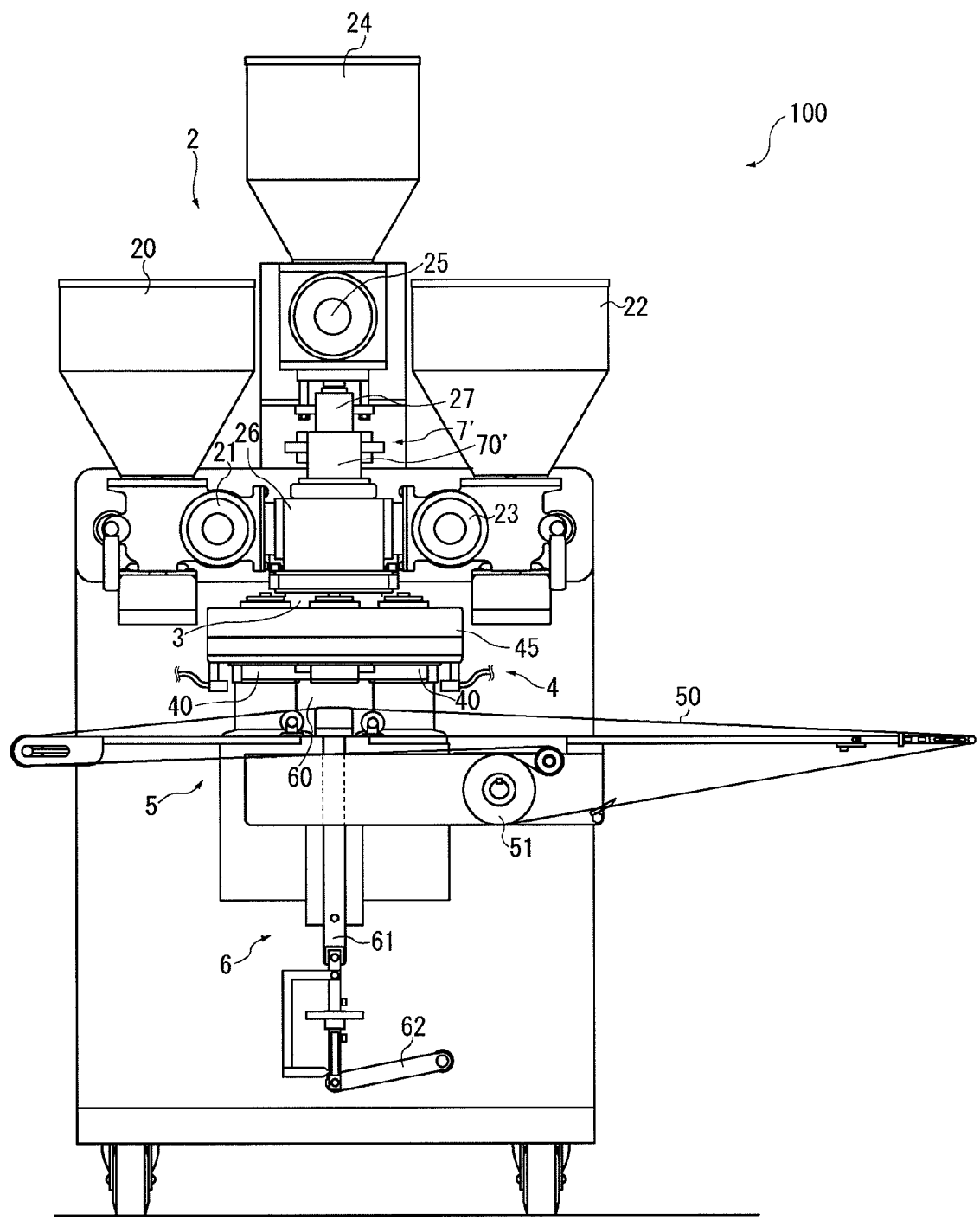
FIG. 15 is a front view illustrating a second embodiment of the present invention.

FIG. 15 is a front view illustrating a second embodiment of the present invention. For better understanding, the parts same as those of the first embodiment are represented by the same reference numerals throughout the figures.

An apparatus for forming food 100 includes a supplying unit 2, a discharging unit 3, a forming unit 4, a conveyor belt 5 and a support unit 6, as in the apparatus for forming food.

The supplying unit 2 supplies an outer food material F and an inner food material G to the discharging unit 3 under pressure. The food material F of this embodiment is dough for fermented food such as bread, yeast-raised doughnut, and Chinese bun. The inner food material G passes through a hopper 20 to a supply line 26 under pressure of a vane pump 21, whereas a batch of the outer food material F passes through a hopper 22 to the supply line 26 under pressure of the vane pump 23. Another batch of the food material F passes through a hopper 24 to the supply line 27 under pressure of a pump 25.

In the supply line 26 and the supply line 27, stirring members are placed in the flow path of the outer food material F, such that movement of the stirring members stirs the food material to develop the gluten of the food material.

The discharging unit 3 is connected to the bottom of the supply line 26, so that the outer and inner food materials F and G are discharged from the supply line 26 downward through the nozzle.

The forming unit 4 includes a plurality of shutter members 40 surrounding the discharging unit 3 as a cutting member, to divide the tubular food material into doughnut-shaped pieces while the materials are continuously discharged through the nozzle.

The conveyor belt 5 is disposed below the forming unit 4, and includes a conveyor belt 50 and a drive roller 51 for driving the belt 50. The doughnut-shaped food products after division are placed on the conveyor belt 50 to be conveyed to the left in the drawing for a subsequent process.

The support unit 6 includes a support member 60 that is disposed in contact with the rear surface of the conveyor belt 50, a support rod 61 holding the support member 60, and a driving bar 62 that vertically moves the support rod 61. Rotation of the driving bar 62 by a driving motor (not illustrated) causes vertical movement of the support member 60. The vertically upward movement of the support member 60 causes the conveyor belt 50 to be lifted to a position close to the rear surface of the forming unit 4.

A nozzle closure 7' opens/closes an annular outlet, which will be described later, and includes an inner cylinder 70' having an inner-nozzle cap, so that vertical movement of the inner cylinder 70' causes opening and closing of the annular outlet. The drive mechanism (not illustrated) for the vertical movement of the inner cylinder 70' may be any mechanism including a rotation drive mechanism using air cylinder or eccentric cam.

Figure 16:
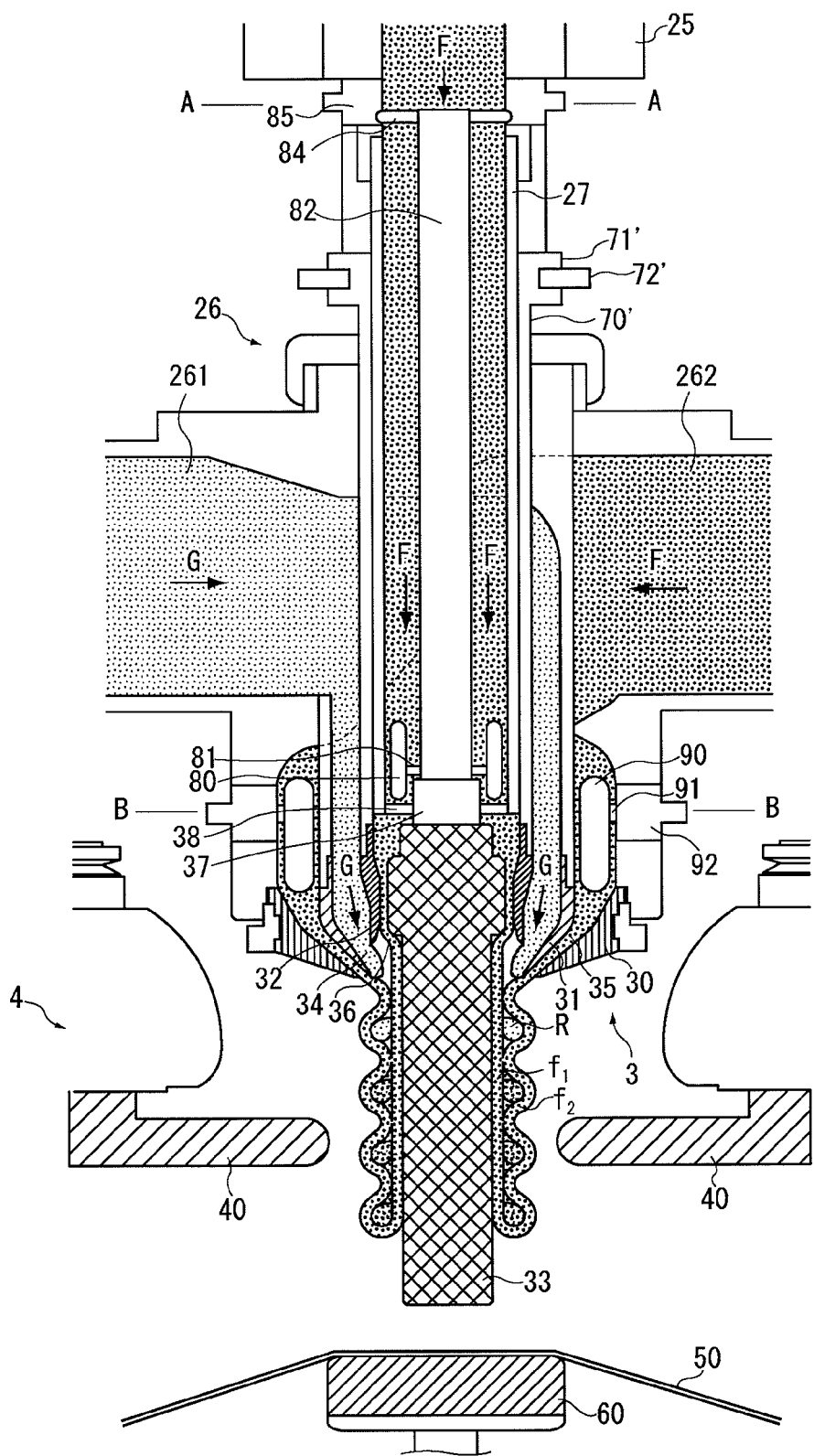
FIG. 16 is a schematic front cross sectional view illustrating the supply line, the discharging unit, and the forming unit in FIG. 15.

FIG. 16 is a schematic cross sectional view illustrating the supply line 26, the supply line 27, the discharging unit 3, and the forming unit 4. The supply line 26 includes an inner-material supply line 261 supplying the inner food material G downward, and an outer-material supply line 262 supplying the outer food material F downward. The inner- and outer-material supply lines 261 and 262 are provided to guide the food materials downward, and have a dual structure at their lower parts, where the outer-material supply line 262 surrounds the inner-material supply line 261.

The inner-material supply line 261 further includes the supply line 27 coaxially therein and the inner cylinder 70' is slidably attached to the outer periphery of the supply line 27. The inner cylinder 70' protrudes from the supply line 26 at the upper end, the end having a locking flange 71' that is engaged with a driving member 72'. The driving member 72' is moved vertically by a drive mechanism (not illustrated), which causes the inner cylinder 70' to move vertically around the outer periphery of the supply line 27.

In this embodiment, the outer-material supply line 262 serves as a flow path supplying an outside outer material, whiles the supply line 27 serves as a flow path supplying an inside outer material. Each of the outside and inside flow paths for the outer food material is provided with stirring members.

Figure 17:
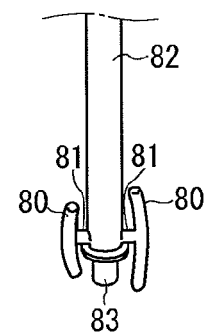
FIG. 17 is an exterior perspective view illustrating a first inner stirring member.
Figure 18:
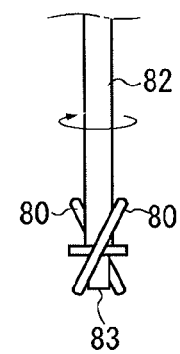
FIG. 18 is a front view illustrating first inner stirring members.

The supply line 27, which is the flow path for the inside outer material, is provided with a first stirring unit having first bar stirring members 80. FIG. 17 is an exterior perspective view and FIG. 18 is a front view, each illustrating the stirring members 80. The stirring members 80 are fixed to a mount 81 that radially projects at the lower end of a shaft 82 extending along the longitudinal axis of the supply line 27. As illustrated in FIG. 17, the stirring members 80 are arranged, like a helix, at an angle relative to the axial direction of the shaft 82.

Figure 19:
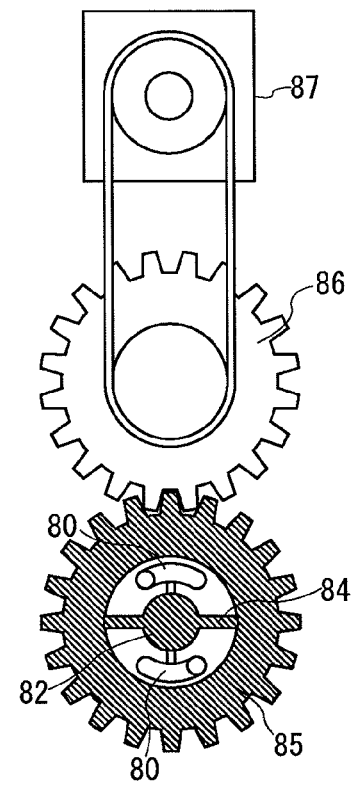
FIG. 19 is a cross sectional view taken along the line A-A in FIG. 16.

The shaft 82 has a lower-end fitting 83 that is rotatably fit in a recess in the top surface of the mount 37 of the inside forming member 33 which will be described later, so that the shaft 82 is supported there. The shaft 82 has an upper end that is fixed to a gear adapter 85 using connectors 84. FIG. 19 is a cross sectional view taken along the line A-A in FIG. 16. The gear adapter 85 is of a ring shape, and is concentric with the supply line 27. The gear adapter 85 has teeth around the outer edge, the teeth being meshed with the driving gear 86 that is driven by a driving motor 87, so that the gear adapter 85 is rotated by the rotation of the driving motor 87. The shaft 82 is fixed such that its longitudinal axis is coincident with the rotation center of the gear adapter 85, and thereby the rotation of the gear adapter 85 causes the shaft 82 to rotate around the central axis. As a result, the stirring members 80 rotate around the shaft 82 as the shaft 82 rotates. In this embodiment, the drive mechanism, including the shaft 82 that fixes the stirring members 80, the gear adapter 85 that fixes the shaft 82, and the driving motor 87 that drives the gear adapter 85, corresponds to a first stirring unit.

The outer food material F, supplied into the supply line 27, flows down a path between the shaft 82 and the supply line 27. During the flow, as illustrated in FIG. 18, the shaft 82 is rotated, and thereby the outer food material F is stirred as in prior art to develop the gluten of thereof.

Figure 20:
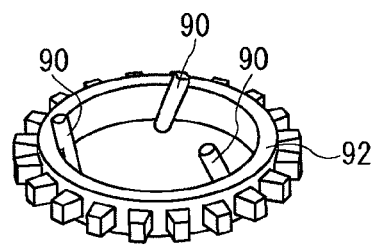
FIG. 20 is an exterior perspective view illustrating a gear adapter.
Figure 21:
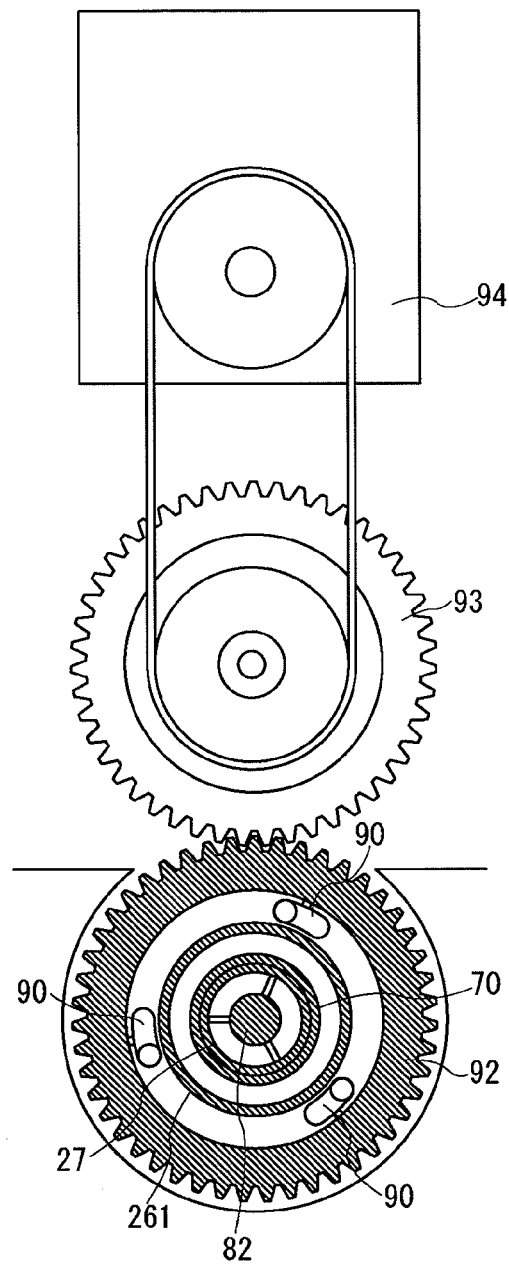
FIG. 21 is a cross sectional view taken along the line B-B in FIG. 16.

The outer-material supply line 262, which is the flow path for the outside outer material, is provided with a second stirring unit having second bar stirring members 90. The stirring members 90 are fixed to the inside of a ring gear adapter 92 using a mount 91. FIG. 20 is an exterior perspective view illustrating the gear adapter 92, and FIG. 21 is a cross sectional view taken along the line B-B in FIG. 16. The gear adapter 92 is disposed concentric with the outer-material supply line 262. The gear adapter 92 has teeth around the outer edge, the teeth being meshed with driving gear 93 that is driven by a driving motor 94 so that the gear adapter 92 is rotated by the rotation driving of the driving motor 94. The stirring members 90 are placed at an angle relative to the rotation axis of the gear adapter 92, and rotate in the gear adapter 92 as the gear adapter 92 rotates. Accordingly, the stirring members 90 stir the outer food material F that flows down through the outer-material supply line 262 in the same way as that of the stirring members 80, to develop the gluten of the outer food material F.

The discharging unit 3 includes a nozzle having: an outer-nozzle cap 30, a middle-nozzle cap 31, and an inner-nozzle cap 32 overlying one another; and an inside forming member 33 therein (the inside of the inner-nozzle cap 32).

The outer-nozzle cap 30 is fit in the lower end opening of the outer-material supply line 262: the middle-nozzle cap 31 in that of the inner-material supply line 261: and the inner-nozzle cap 32 in that of the inner cylinder 70'. The inside forming member 33 is a bar component coaxially fixed to the mount 37 that is fixedly connected to the lower end opening of the supply line 27 using connecting rods 38, and has a lower end protruding downward through the inner-nozzle cap 32 to face to the top of the support member 60.

The outer-nozzle cap 30, the middle-nozzle cap 31, the inner-nozzle cap 32 and the inside forming member 33 are coaxially disposed, and the caps each have a circular opening at the lower end thereof, the openings being concentrically arranged. Through the openings, the circular inside forming member 33 is concentrically arranged. This arrangement provides concentric annular outlets between the inside forming member 33 and each cap.

The annular outlet 34 between the middle-nozzle cap 31 and the inner-nozzle cap 32 is in communication with the inner-material supply line 261 to discharge the inner food material G. The annular outlet 35 between the outer-nozzle cap 30 and the middle-nozzle cap 31 is in communication with the outer-material supply line 262 to discharge the outer food material F. The annular outlet 36 between the inner-nozzle cap 32 and the inside forming member 33 is in communication with the supply line 27 to discharge the outer food material F.

The inner-nozzle cap 32 vertically moves based on the vertical movements of the inner cylinder 70'. Upward movement of the inner cylinder 70' causes the inner-nozzle cap 32 to be away from the middle-nozzle cap 31, and opens the annular outlet 34 as illustrated in FIG. 16. Downward movement of the inner cylinder 70' causes the lower end of the inner-nozzle cap 32 to abut the lower end of the middle-nozzle cap 31, and closes the annular outlet 34. Accordingly, the repetition of the upward movement of the inner cylinder 70' for a predetermined period of time and downward movement for a predetermined period results in regular opening and closing of the annular outlet 34. By driving the pump 21 to supply the inner food material G to the inner-material supply line 261 under pressure only while the annular outlet 34 is open, the inner food material G can be intermittently discharged from the annular outlet 34. The intermittent discharge of the inner food material G from the annular outlet 34 results in discharge of ring-shaped portions of the inner food material.

The outer food material F is continuously discharged from between the inner-nozzle cap 32 and the inside forming member 33 toward the outer periphery surface of the inside forming member 33, and is brought into close contact with the outer periphery surface to form an inside outer-material layer f1. From the annular outlet 34, the ring-shaped inner material portions G are intermittently discharged so as to be brought into close contact with the inside outer-material layer f1 at predetermined intervals.

After continuously discharged from between the outer-nozzle cap 30 and the middle-nozzle cap 31, the outer food material F forms an outside outer-material layer f2 that covers the ring-shaped inner material portions R. Consequently, as in the first embodiment, the ring-shaped inner material portions R, the inside outer-material layer f1, and the outside outer-material layer f2 are formed into a tube around the inside forming member 33 and continuously discharged, with the ring-shaped inner material portions R being sandwiched between the inside and outside outer-material layers f1 and f2.

Through the dividing and forming processes in FIGS. 6 to 9, various doughnut-shaped food products can be formed with inner food materials covered with dough for fermented food such as bread, yeast-raised doughnut, and Chinese bun. Examples of the products include ring-shaped stuffed breads, ring-shaped stuffed doughnuts, ring-shaped candies, and Chinese steamed buns with mince filling. Examples of the inner food materials include creams such as chocolate and custard flavored creams, granulated or chopped food material such as mince filling.

Figure 22A:
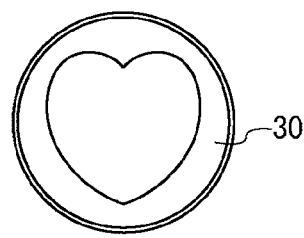
FIGS. 22A-22C are exterior views each illustrating an opening shape of an outer-nozzle cap.
Figure 22B:
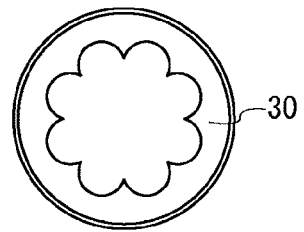
Figure 22C:
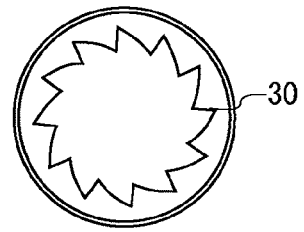
Figure 23A:
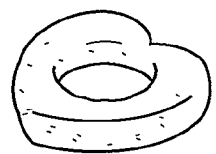
FIGS. 23A-23C are exterior views each illustrating a doughnut-shaped food product.
Figure 23B:
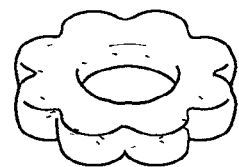
Figure 23C:
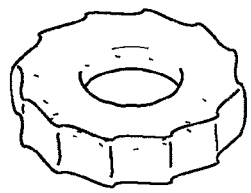

As illustrated in FIG. 22, the opening of the outer-nozzle cap 30 may have various shapes other than circle to provide the resulting food products with various shapes. For example, the heart-shaped cap in FIG. 22A provides doughnut-shaped food products with heart-shaped edges as illustrated in FIG. 23A. The flower-shaped cap in FIG. 22B and the jagged cap in FIG. 22C provide food products with the corresponding edge shapes as illustrated in FIGS. 23B and 23C respectively.

Figure 24:
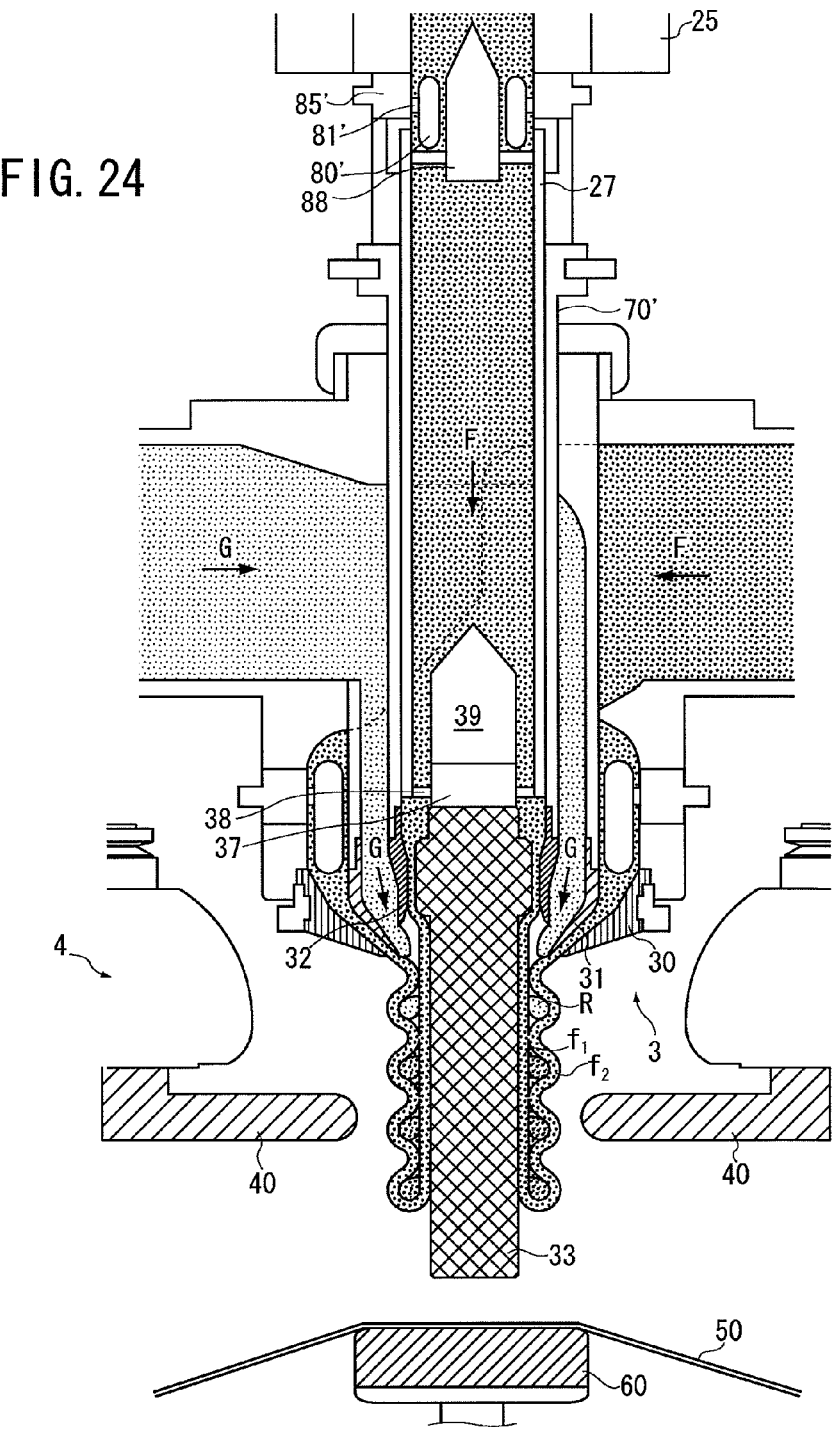
FIG. 24 is a schematic cross sectional view illustrating a modification of the second embodiment.

FIG. 24 is a schematic cross sectional view illustrating a modification of the second embodiment in FIG. 16. In the modification, the stirring members of a first stirring unit are directly attached to a gear adapter, eliminating a shaft from the supply line 27. The other structures of the modification are similar to those of the second embodiment in FIG. 16, which will not be described.

Figure 25:
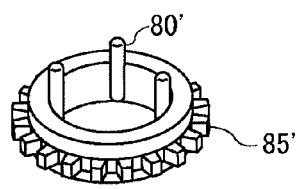
FIG. 25 is an exterior perspective view illustrating a gear adapter.

Stirring members 80' similar to the stirring members 80 are fixed to the inside of the gear adapter 85' similar to the gear adapter 85 in FIG. 16 using a mount 81'. In the gear adapter 85', a rectifier 88 is disposed with a conical tip at the upper end. The rectifier 88 is fixed in the supply line 27 at the lower end using a mount 89. The stirring members 80' are placed to rotate around the rectifier 88. As illustrated in FIG. 25, the stirring members 80' are disposed substantially along the rotation axis of the gear adapter 85', so that the stirring members 80' rotate in the gear adapter 85' as the gear adapter 85' rotates. The outer food material F flows through the supply line 27 downward along the contour of the rectifier 88 into the space where the stirring members 80' rotate. The stirring members 80' stir the outer food material F like the stirring members 80 to develop the gluten of the outer food material F.

The mount 37 has a rectifier 39 having a conical tip at the upper end which guides the outer food material F to flow through the supply line 27 along the contour of the rectifier 39 to surround the inside forming member 33.

Figure 26:
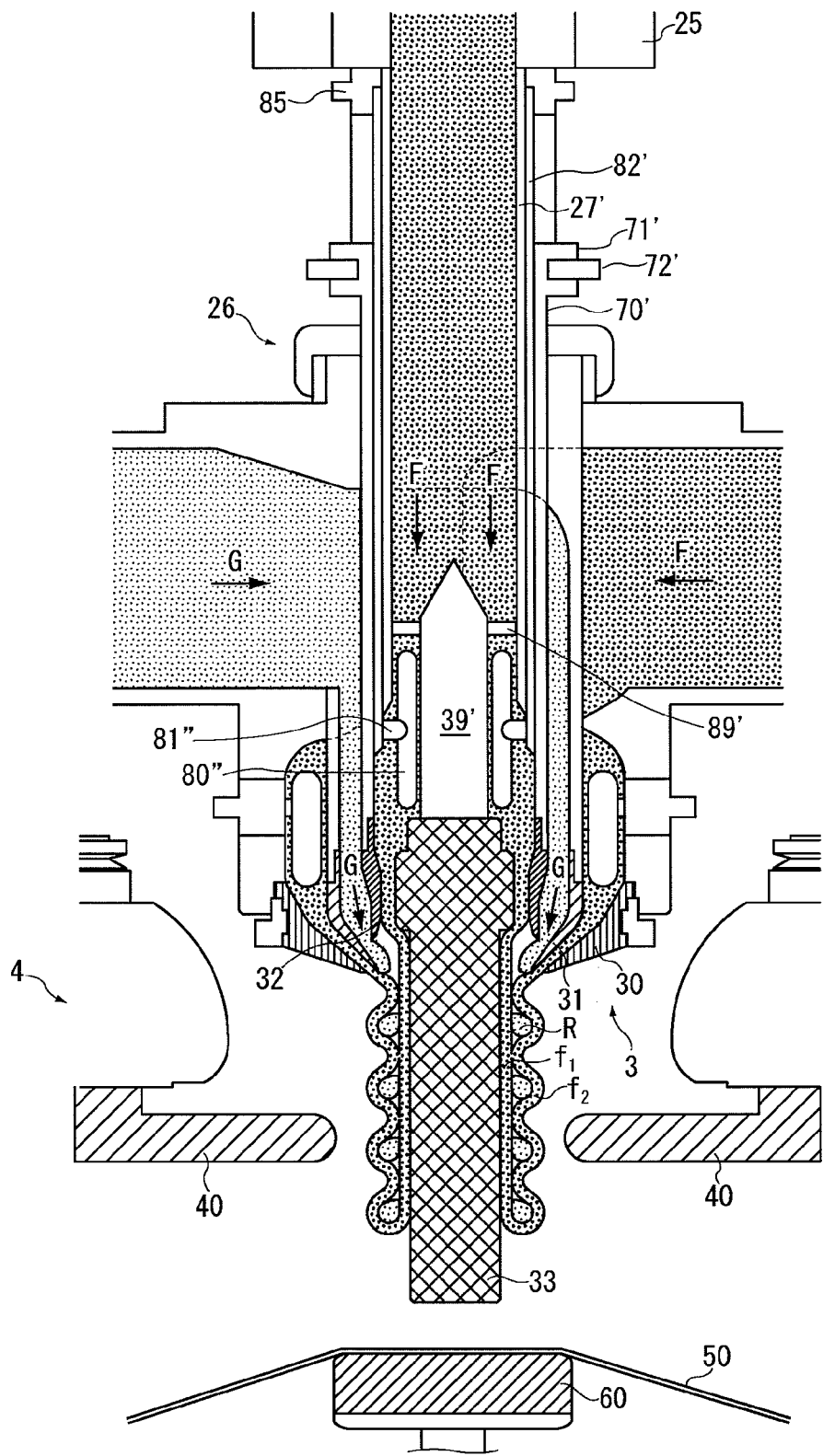
FIG. 26 is a schematic cross sectional view illustrating another modification of the second embodiment.

FIG. 26 is a schematic cross sectional view illustrating another modification of the second embodiment in FIG. 16. In this modification, a cylindrical member 82' is used in the first stirring unit, in place of the shaft 82 in FIG. 16. A rectifier and an inside forming member are mounted to the cylindrical member 82', eliminating a shaft from the supply line. The other structures of this modification are similar to those of the second embodiment in FIG. 16, which will not be described.

A supply line 27' runs through a gear adapter 85 to be coupled to a pump 25. Around the supply line 27', a cylindrical member 82' is rotatably attached, with the top end of the cylindrical member 82' being fixedly connected to the gear adapter 85. A rectifier 39' is coaxially fixed to the inside of the lower portion of the supply line 27' with connectors 89'. The rectifier 39' has a conical tip upper end, and a lower end connected to the inside forming member 33 coaxially with the supply line 27'.

The lower end of the cylindrical member 82' resides below the lower end of the supply line 27', so that the stirring members 80" similar to the stirring members 80 are fixed to the inside of the lower end of the cylindrical member 82' using a mount 81". The stirring members 80" are placed to rotate around the rectifier 39'.

The outer food material F flows through the supply line 27' downward along the contour of the rectifier 39' into the space where the stirring members 80" rotate. The stirring members 80" stir the outer food material F like the stirring members 80 to develop the gluten of the outer food material F.

In this modification, the stirring members 80", the rectifier 39', and the inside forming member 33 are all disposed at the lower portion of the supply line 27', reducing the number of components used, and enabling a forming operation through effective stirring. The connectors 89' fixing the rectifier 39' are placed above the stirring members 80". Even if the outer food material F, which flows downward through the supply line 27', is split by the connectors 89' during the flow, the stirring operation by the stirring members 80" downstream combines the outer food material F again to be discharged.

Figure 27:
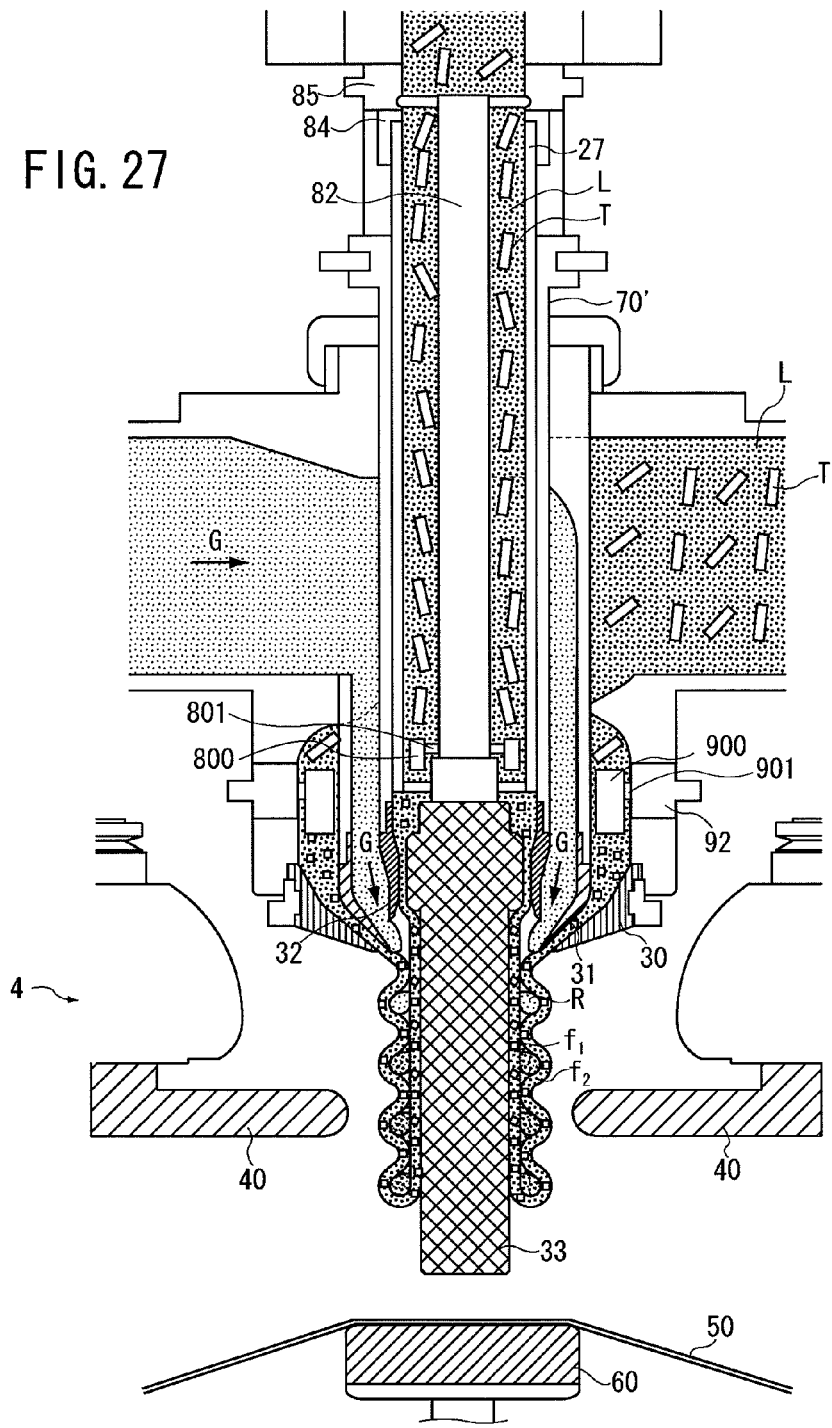
FIG. 27 is a schematic cross sectional view illustrating a third embodiment of the present invention.

FIG. 27 is a schematic cross sectional view similar to FIG. 16, illustrating a third embodiment. In this embodiment, first and second stirring units each have stirring members as cutting blades. The other structures of the third embodiment are similar to those in FIG. 16, which will not be described below.

Figure 28:
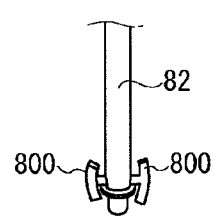
FIG. 28 is an exterior perspective view illustrating stirring members.
Figure 29:
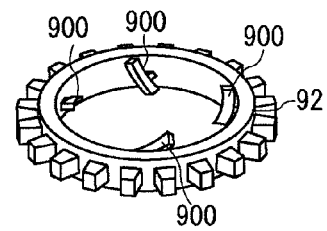
FIG. 29 is an exterior perspective view illustrating a gear adapter.

As illustrated in FIG. 28, stirring members 800 of the first stirring unit are narrow plates attached to the lower end of the shaft 82 at an angle like the rod stirring members 80, using a mount 801. As illustrated in FIG. 29, stirring members 900 of the second stirring unit are narrow plates attached to the inside of a gear adapter 92 like the rod stirring members 90, using a mount 901.

In the third embodiment, a short crust dough L is supplied to a supply line 27 and an outer-material supply line 262 as an outer food material, the dough L being sufficiently soft to form a layer structure and containing margarine chips T mixed therein. When the short crust dough L passes through the spaces where the stirring members 800 and 900 rotate, the margarine chips T are sliced into smaller pieces by the stirring members 800 and 900. Accordingly, doughnut-shaped food products can be formed with an outer food material of the short crust dough, which contains the sliced margarine pieces, covering an inner food material G.

The stirring members 800 may be placed at higher position as in FIG. 24.

Figure 30:
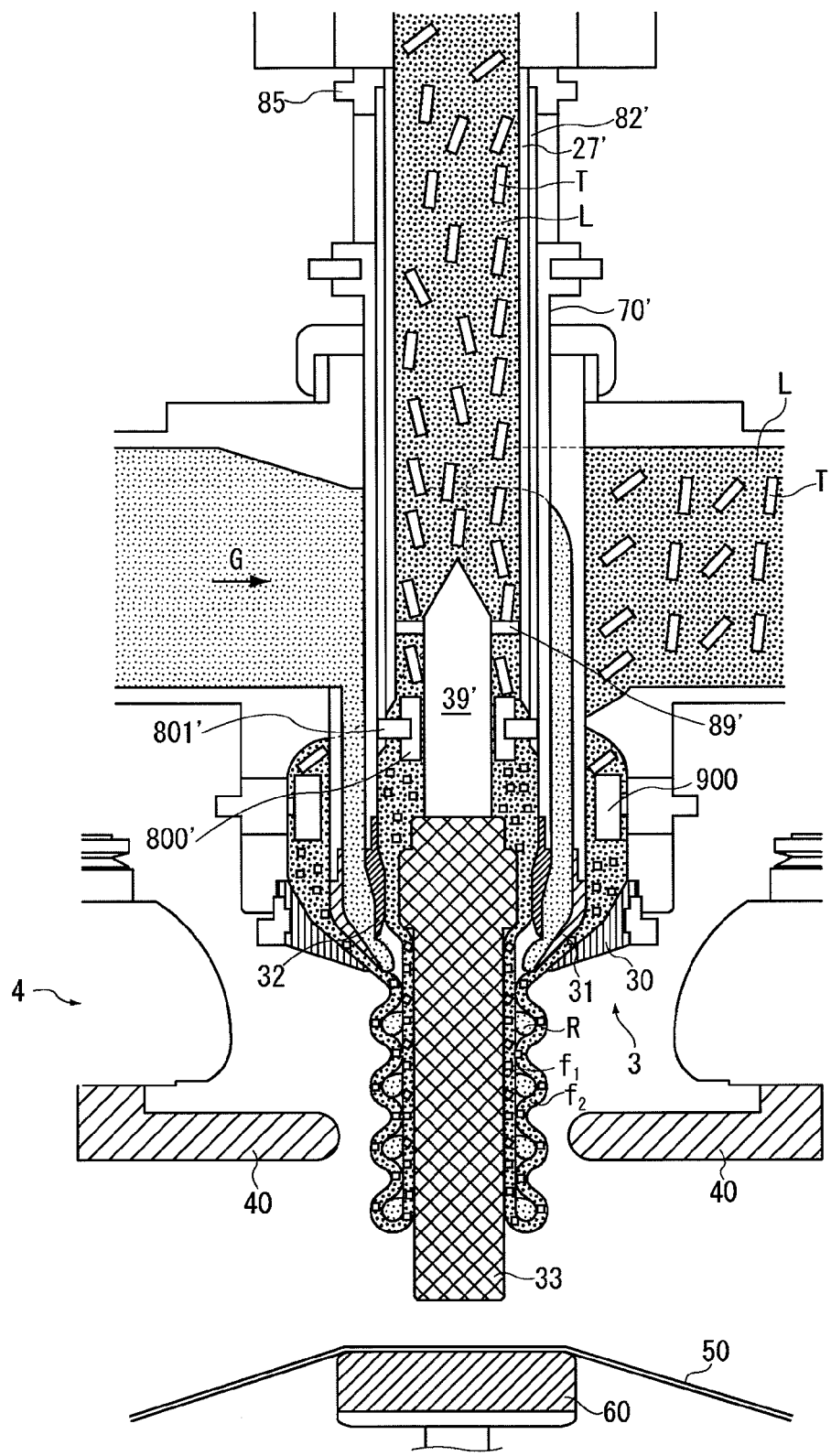
FIG. 30 is a schematic cross sectional view illustrating a modification of the present invention.

FIG. 30 is a schematic cross sectional view illustrating another modification of the third embodiment in FIG. 27. In this modification, a cylindrical member 82' is used in a first stirring unit, in place of the shaft 82, as in the modification in FIG. 26. A rectifier and an inside forming member are mounted to the cylindrical member 82', eliminating a shaft from the supply line. The other structures of this modification are similar to those of the second embodiment in FIG. 16, which will not be described.

As in the modification in FIG. 26, a rectifier 39' is mounted to the inside of the lower portion of the supply line 27', using connectors 89'. Stirring members 800' similar to the stirring members 800 are fixed to the inside of the lower end of a cylindrical member 82' using a mount 801', the cylindrical member 82' being rotatably mounted around the supply line 27'. The stirring members 800' are placed to rotate around the rectifier 39'.

The short crust dough L flows through the supply line 27' along the contour of the rectifier 39' into the space where the stirring members 800' rotate. The stirring members 800' stir the short crust dough like the stirring members 800, so that the margarine chips T in the dough L are sliced into smaller pieces by the stirring members 800'.

In this embodiment also, as in the modification in FIG. 26, the connectors 89' fixing the rectifier 39' are placed above the stirring members 800', and thereby if the short crust dough L is split by the connectors 89', the stirring operation by the stirring members 800' downstream combines the short crust dough L again to be discharged.

In the above second and third embodiments, the stirring members are placed at an angle relative to the rotational axis, but may be placed conveniently depending on food materials to be stirred, for example, parallel to the rotational axis. When a food material other than dough for fermented food that requires no stirring is used, the rotation of stirring members can be stopped during the formation process. In this situation, formation of various food materials can be achieved to provide cake doughnuts, ring cookies, ring croquettes, and ring hamburger steaks, for example.

REFERENCE SIGNS LIST 1 apparatus for forming food
100 apparatus for forming food
2 supplying unit
3 discharging unit
4 forming unit
5 conveyor belt
6 support unit
80 stirring members
90 stirring members
800 stirring members
900 stirring members

CITATION LIST

Patent Literature

Patent Literature 1: Japanese Examined Patent Publication (Kokoku) No. 47-40390 (Japanese Patent No. 4437843)
Patent Literature 2: Japanese Patent Application Laid-Open No. 10-99024

The invention claimed is:

1. An apparatus for forming food into doughnut shape, comprising:
a supplying unit supplying an inner food material and an outer food material;
a discharging unit including a plurality of nozzles combined as multiple nozzles to discharge the inner food material and the outer food material downward,
an inside forming member having an outside surface, a part of said inside forming member being disposed inside of the nozzles and part of said inside forming member protruding in a downward direction therefrom, and a plurality of annular outlets between each of the nozzles and the inside forming member, that the annular outlets discharging the food materials into a tubular shape formed over the outside surface of said inside forming member from the outlets with the outer food material sandwiching the inner food material;
an opening/closing unit opening and closing the annular outlet from which the inner food material is intermittently discharged as ring portions at intervals; and
a forming unit including a plurality of cutting members disposed under the discharging unit nozzle and around the inside forming member and being operative to move in a first direction orthogonal to the downward direction, the forming unit dividing the tubular food material discharged from the discharging unit into rings by moving the cutting members across the outer food material between the ring portions of the inner food material so as to bring the cutting members into cutting contact with the outside surface of the inside forming member.

2. The apparatus for forming food into doughnut shape according to claim 1, further comprising:
a first stirring unit including a first stirring member that is disposed in an inside flow path through which the outer food material flows, the first stirring unit stirring the flowing outer food material by moving the first stirring member; and
a second stirring unit including a second stirring member that is disposed in an outside flow path through which the outer food material flows, the second stirring unit stirring the flowing outer food material by moving the second stirring member.

3. The apparatus for forming food into doughnut shape according to claim 1, wherein each of said plurality of cutting members is rotatable in said first direction around a respective axis that is parallel to said downward direction.

4. The apparatus for forming food into doughnut shape according to claim 1, further comprising a cutting member drive mechanism, wherein said plurality of cutting members are rotated by said common drive mechanism.

5. The apparatus for forming food into doughnut shape according to claim 1, wherein said plurality of cutting members are slideable in a second direction that is substantially in said downward direction.

6. The apparatus for forming food into doughnut shape according to claim 1, wherein said forming unit is moveable in a direction co-axial with said inside forming member.

7. The apparatus for forming food into doughnut shape according to claim 6, wherein said forming unit is moveable downward with said cutting members in contact with said inside forming member, whereby a divided tubular food material is scraped off of said inside forming member.

8. The apparatus for forming food into doughnut shape according to claim 7, wherein said forming unit is moveable upward with said cutting members out of contact with said inside forming member, whereby said cutting members are moved to a cutting position for dividing said tubular food material.

9. The apparatus for forming food into doughnut shape according to claim 7, further comprising a conveying member for receiving and conveying said scraped off divided tubular food member.

10. The apparatus for forming food into doughnut shape according to claim 1, wherein said inside forming member has one of a substantially circular or substantially polygonal cross section.

\* \* \* \* \*